United States Patent
Wang et al.

(10) Patent No.: US 11,094,334 B2
(45) Date of Patent: Aug. 17, 2021

(54) SOUND PROCESSING METHOD AND APPARATUS

(71) Applicant: HUAWEI TECHNOLOGIES CO., LTD., Guangdong (CN)

(72) Inventors: Lelin Wang, Shenzhen (CN); Tizheng Wang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 41 days.

(21) Appl. No.: 16/710,388

(22) Filed: Dec. 11, 2019

(65) Prior Publication Data

US 2020/0118580 A1 Apr. 16, 2020

Related U.S. Application Data

(63) Continuation of application No. PCT/CN2018/084523, filed on Apr. 25, 2018.

(30) Foreign Application Priority Data

Jun. 12, 2017 (CN) .......................... 201710440005.X

(51) Int. Cl.
| | |
|---|---|
| *G10L 21/0216* | (2013.01) |
| *H04R 3/00* | (2006.01) |
| *G01S 5/18* | (2006.01) |

(52) U.S. Cl.
CPC .......... *G10L 21/0216* (2013.01); *H04R 3/005* (2013.01); *G01S 5/18* (2013.01); *G10L 2021/02166* (2013.01)

(58) Field of Classification Search
CPC . G10L 21/0216; G10L 21/0208; G10L 25/21; G10L 2021/02165;
(Continued)

(56) References Cited

U.S. PATENT DOCUMENTS

| | | |
|---|---|---|
| 2010/0110232 A1 | 5/2010 | Zhang et al. |
| 2012/0062729 A1 | 3/2012 | Hart et al. |

(Continued)

FOREIGN PATENT DOCUMENTS

| | | |
|---|---|---|
| CN | 102780947 A | 11/2012 |
| CN | 102948168 A | 2/2013 |

(Continued)

OTHER PUBLICATIONS

Karunasiri Gamani et al: ""MEMS directional acoustic sensor forlocating sound sources"", Proceedings of SPIE; [Proceedings of SPIE ISSN 0277-786X vol. 10524], SPIE, US, vol. 10036, Feb. 3, 2016 (Feb. 3, 2016), pp. 100361A-100361 A, XP060081593.

(Continued)

*Primary Examiner* — Yogeshkumar Patel
(74) *Attorney, Agent, or Firm* — Womble Bond Dickinson (US) LLP

(57) ABSTRACT

The present invention discloses a sound processing method and apparatus. The method is applied to a non-video-call scenario. The method includes: when it is detected that a camera of a terminal is in a shooting state, collecting a sound signal by using the two microphones at the top of the terminal; calculating an interaural level difference between the two microphones based on collected sound signals according to a preset first algorithm; determining whether the interaural level difference meets a sound source direction determining condition; if the determining condition is met, determining, based on the interaural level difference, whether the sound signal includes a rear sound signal, where the rear sound signal is a sound signal whose sound source is located behind the camera; and if it is determined that the sound signal includes a rear sound signal, filtering out the rear sound signal from the sound signal.

22 Claims, 6 Drawing Sheets

(58) Field of Classification Search
CPC . G10L 2021/02166; H04R 3/005; G01S 5/18; H04M 2250/52; H04M 1/6008; H04M 1/72403
See application file for complete search history.

(56) References Cited

U.S. PATENT DOCUMENTS

| | | |
|---|---|---|
| 2012/0163624 A1 | 6/2012 | Hyun |
| 2013/0021503 A1 | 1/2013 | Zurek et al. |
| 2015/0163587 A1 | 6/2015 | Li |
| 2015/0245133 A1 | 8/2015 | Kim et al. |

FOREIGN PATENT DOCUMENTS

| | | | |
|---|---|---|---|
| CN | 104378570 A | 2/2015 | |
| CN | 104599674 A | 5/2015 | |
| CN | 104699445 A | 6/2015 | |
| CN | 106331501 A | 1/2017 | |
| EP | 2882170 A1 | 6/2015 | |
| EP | 3531674 A1 * | 8/2019 | ......... G06K 9/00268 |
| EP | 3531674 A1 | 8/2019 | |

OTHER PUBLICATIONS

Franck Ruffier et al: ""A tiny directional sound sensor inspired bycrickets designed for micro-air vehicles"", 2011 IEEE Sensors Proceedings : Limerick, Ireland, Oct. 28-31, 2011, IEEE, Piscataway, NJ, Oct. 28, 2011 (Oct. 28, 2011), pp. 970-973, XP032093184.

* cited by examiner

SOUND PROCESSING METHOD AND APPARATUS

CROSS-REFERENCE TO RELATED APPLICATIONS

This application is a continuation of International Application No. PCT/CN2018/084523, filed on Apr. 25, 2018, which claims priority to Chinese Patent Application No. 201710440005.X, filed on Jun. 12, 2017. The disclosures of the aforementioned applications are hereby incorporated by reference in their entireties.

TECHNICAL FIELD

The present invention relates to the field of terminal technologies, and in particular, to a sound processing method and apparatus.

BACKGROUND

When collecting or inputting a voice signal, a voice processing device is inevitably interfered by various noise. In an actual voice communications system, common noise includes steady noise and a directional interference sound source. Such noise easily causes interference to a target sound signal, greatly reducing auditory comfort and intelligibility of collected sound. Conventional noise estimation and single-channel voice enhancement algorithms are far from ideal for suppressing directional interference noise. Therefore, some systems that have a capability of suppressing interference noise are designed according to an actual condition, to implement targeted pickup of target voice and a capability of suppressing other noise.

A majority of existing sound source localization algorithms use technologies, such as beamforming and sound source localization that is based on a delay difference, to determine an azimuth of a sound source in a sound field, and then use a fixed beam or adaptive beam method, to reduce out-of-beam interference to the sound source and implement targeted sound pickup.

In a terminal-based shooting scenario, a user performs shooting by using a camera of a terminal. According to an existing sound source localization technology based on a delay difference, in a low signal-to-noise ratio scenario, azimuth information of a target sound source (a sound source in a same direction as a camera shooting direction) is usually subject to aliasing from azimuth information of a noise source (a sound source in a direction opposite to the camera shooting direction). Therefore, a large amount of noise occurs in a video shooting process, causing low accuracy in picking up the target sound source and presence of a large amount of noise in final photographed content.

SUMMARY

Embodiments of the present invention provide a sound processing method and apparatus, to resolve an existing problem of severe aliasing noise and low accuracy in picking up a target sound source during targeted pickup of the target sound signal.

Specific technical solutions provided in the embodiments of the present invention are as follows:

According to a first aspect, an embodiment of the present invention provides a sound processing method, where the method is applied to a terminal equipped with two microphones at the top of the terminal, the two microphones are located respectively in the front and at the back of the terminal, the method is applied to a non-video-call scenario, and the method includes:

when a camera of the terminal is in a shooting state, collecting a sound signal in a current environment of the terminal by using the two microphones; calculating an interaural level difference between the two microphones based on collected sound signals according to a preset first algorithm; determining whether the interaural level difference between the two microphones meets a sound source direction determining condition; if the sound source direction determining condition is met, determining, based on the interaural level difference between the two microphones, whether the sound signal includes a rear sound signal, where the rear sound signal is a sound signal whose sound source is located behind the camera, and the camera cannot shoot an area behind the camera; and if it is determined that the sound signal includes a rear sound signal, filtering out the rear sound signal from the sound signal.

According to a second aspect, an embodiment of the present invention provides a sound processing apparatus, where the apparatus is applied to a terminal equipped with two microphones at the top of the terminal, the two microphones are located respectively in the front and at the back of the terminal, the apparatus is applied to a non-video-call scenario, and the apparatus includes:

a collection module, configured to: when a camera of the terminal is in a shooting state, collect a sound signal in a current environment of the terminal by using the two microphones;

a calculation module, configured to calculate an interaural level difference between the two microphones based on collected sound signals according to a preset first algorithm;

a judging module, configured to determine whether the interaural level difference between the two microphones meets a sound source direction determining condition;

a determining module, configured to: if the sound source direction determining condition is met, determine, based on the interaural level difference between the two microphones, whether the sound signal includes a rear sound signal, where the rear sound signal is a sound signal whose sound source is located behind the camera, and the camera cannot shoot an area behind the camera; and a filtering module, configured to: if it is determined that the sound signal includes a rear sound signal, filter out the rear sound signal from the sound signal.

The foregoing mentioned area behind the camera may be defined by using a plane on which a main body of the terminal is located as a boundary. The plane on which the main body of the terminal is located can divide entire space into two portions, where a spatial portion of an area that can be shot by the camera may be understood as an area in front of the camera, and the other portion may be understood as an area behind the camera. Obviously, the camera cannot shoot the area behind the camera. If a field of view of the camera cannot cover all areas in front of the camera, the camera cannot shoot all the areas in front of the camera, but only some areas. In a specific implementation process, the terminal may include a front camera and a rear camera. A corresponding principle of the front camera is similar to that of the rear camera, and both are clear and easily understood. Details are not described again in the embodiments of the present invention.

In one embodiment, a rear sound signal in a sound signal may be determined by using a specific algorithm and then filtered out. In this way, a noise signal beyond a shooting range can be filtered out during shooting, to ensure voice quality of a video during shooting, thereby improving user experience.

In one embodiment, the terminal needs to detect a shooting status of the camera, and when it is determined that the camera is in a shooting state, a location of the camera may be further determined. If the terminal has only one camera, the location of the camera may be directly obtained. If the terminal has a plurality of cameras, when it is detected that a camera is in a shooting state, the specific camera used for shooting may be further determined, so that a processor performs subsequent signal processing based on a location of the camera by using a corresponding algorithm. The detecting a shooting status of the camera may be implemented in a manner, such as periodic program detection or detection of an enable signal of the camera.

This step may be performed by a collection module. More specifically, this technology may be implemented by a processor invoking a program and an instruction stored in a memory to perform a corresponding operation. According to this design solution, an enable state of the camera and the location of the camera can be obtained.

In one embodiment, when the camera of the terminal is in a shooting state, the terminal may receive a trigger instruction from a user, where the trigger instruction is used to trigger the top microphones to collect a sound signal in a current environment. The user may choose to filter out a rear sound signal or not in a shooting process based on the user's own preference. If the user cares about the rear sound signal, the user may input a corresponding trigger instruction to the terminal, so that the terminal filters out the rear sound signal; or if the user does not care about the rear sound signal, the user may choose a normal shooting mode, that is, a function of filtering out the rear sound signal is not triggered.

In one embodiment, the calculating an interaural level difference between the two microphones based on collected sound signals according to a preset first algorithm includes: dividing the sound signal into at least one frame based on a preset time interval; obtaining sound signals S1 and S2 collected by the two microphones in a $y^{th}$ frame, and calculating power spectrums $P_1$ and $P_2$ of S1 and S2 respectively by using a fast Fourier transform (FFT) algorithm, where the $y^{th}$ frame is any frame of the at least one frame; and calculating the interaural level difference between the two microphones based on $P_1$ and $P_2$ by using the following formula:

$$ILD_{now} = \frac{P_1 - P_2}{P_1 + P_2}$$

where $P_1$ represents a corresponding sound power spectrum of the front top microphone in the $y^{th}$ frame, $P_2$ represents a corresponding sound power spectrum of the rear top microphone in the $y^{th}$ frame, both $P_1$ and $P_2$ are vectors each having N elements, the N elements are values of corresponding N frequencies after fast Fourier transform is performed on the sound signal in the $y^{th}$ frame, N is an integer greater than 1, and $ILD_{now}$ is a vector including interaural level differences corresponding to the N frequencies.

In one embodiment, during the collection of the sound signal, the collected sound signals are divided into frames based on the preset time interval. Assuming that every 200 ms is a frame, each time a 200 ms signal is collected, the processor processes the signal into one frame. For example, if a 10 s sound signal is collected, the 10 s sound signal is processed into 50 frames in a time sequence.

In one embodiment, the collected sound signals may be divided into frames during the collection of the sound signals or after a sound signal of predetermined duration is collected. Assuming that every 50 ms is one frame, when a 200 ms signal is collected, the processor processes the 200 ms signal into four frames in a unified and one-off manner. For example, if a 10 s sound signal is collected, the 10 s sound signal is processed into 50 combinations of four frames in a time sequence, totaling 200 frames.

There are quite many similar manners for processing a sound signal, and details are not described herein.

This step may be performed by a collection module and a calculation module. More specifically, this technology may be implemented by a processor controlling audio frequency circuits of the microphones to collect a sound signal, and invoking a program and an instruction stored in a memory to perform a corresponding operation on collected sound signals. In this design solution, the interaural level difference can be calculated. It is worth noting that there are many alternatives to a method for calculating the interaural level difference, and they are not listed one by one herein.

In one embodiment, the determining whether the interaural level difference between the two microphones meets a sound source direction determining condition includes: for the $y^{th}$ frame, calculating, by using an interaural level difference corresponding to an $i^{th}$ frequency between the two microphones, a maximum reference value and a minimum reference value that correspond to the $i^{th}$ frequency according to a preset second algorithm, where the $i^{th}$ frequency is one of the N frequencies, and i is any positive integer not greater than N;

if a difference between the maximum reference value and the minimum reference value that correspond to the $i^{th}$ frequency is greater than a first threshold corresponding to the $i^{th}$ frequency, determining that the interaural level difference between the two microphones meets the sound source direction determining condition at the $i^{th}$ frequency; or if a difference between the maximum reference value and the minimum reference value is not greater than a first threshold corresponding to the $i^{th}$ frequency, determining that the interaural level difference between the two microphones does not meet the sound source direction determining condition at the $i^{th}$ frequency; and if the sound source direction determining condition is met at M frequencies of the N frequencies, determining that the interaural level difference between the two microphones meets the sound source direction determining condition in the $y^{th}$ frame, where M is greater than or equal to N/2.

This step may be performed by a judging module. More specifically, this technology may be implemented by a processor invoking a program and an instruction stored in a memory to perform a corresponding operation. This design solution provides a rule for determining whether the interaural level difference can be used to determine noise, thereby offering a usage reference for how to properly utilize the interaural level difference subsequently. There may be a plurality of alternatives to a specific determining method, and this is not limited in the present invention. The first threshold may be set as required based on an empirical value, and this is still not limited in the present invention.

In one embodiment, the calculating, by using an interaural level difference corresponding to an $i^{th}$ frequency between the two microphones, a maximum reference value and a minimum reference value that correspond to the $i^{th}$ frequency according to a preset second algorithm includes:

obtaining a maximum reference value corresponding to an $(i-1)^{th}$ frequency, where the $(i-1)^{th}$ frequency is a previous frequency of the $i^{th}$ frequency, and if the interaural level difference corresponding to the $i^{th}$ frequency between the two microphones is not greater than the maximum reference value corresponding to the $(i-1)^{th}$ frequency, calculating the maximum reference value corresponding to the $i^{th}$ frequency by using the following formula:

$$ILD_{max}=\alpha_{low}*ILD_{now}+(1-\alpha_{low})*ILD_{max}'; \text{ or}$$

if the interaural level difference corresponding to the $i^{th}$ frequency between the two microphones is greater than the maximum reference value corresponding to the $(i-1)^{th}$ frequency, calculating the maximum reference value corresponding to the $i^{th}$ frequency by using the following formula:

$$ILD_{max}=\alpha_{fast}*ILD_{now}+(1-\alpha_{fast})*ILD_{max}'; \text{ and}$$

obtaining a minimum reference value corresponding to the $(i-1)^{th}$ frequency, and if the interaural level difference corresponding to the $i^{th}$ frequency between the two microphones is greater than the minimum reference value corresponding to the $(i-1)^{th}$ frequency, calculating the minimum reference value corresponding to the $i^{th}$ frequency by using the following formula:

$$ILD_{min}=\alpha_{fast}*ILD_{low}+(1-\alpha_{low})*ILD_{min}'; \text{ or}$$

if the interaural level difference corresponding to the $i^{th}$ frequency between the two microphones is not greater than the minimum reference value corresponding to the $(i-1)^{th}$ frequency, calculating the minimum reference value corresponding to the $i^{th}$ frequency by using the following formula:

$$ILD_{min}=\alpha_{fast}*ILD_{now}+(1-\alpha_{fast})*ILD_{min}'; \text{ where}$$

$ILD_{now}$ represents the interaural level difference corresponding to the $i^{th}$ frequency between the two microphones, $ILD_{max}$ represents the maximum reference value corresponding to the $i^{th}$ frequency, $ILD_{max}'$ represents the maximum reference value corresponding to the $(i-1)^{th}$ frequency, $ILD_{min}$ represents the minimum reference value corresponding to the $i^{th}$ frequency, $ILD_{min}'$ represents the minimum reference value corresponding to the $(i-1)^{th}$ frequency, $\alpha_{fast}$ and $\alpha_{low}$ represent preset step values, and $\alpha_{fast}>\alpha_{low}$.

This step may be performed by a judging module. More specifically, this technology may be implemented by a processor invoking a program and an instruction stored in a memory to perform a corresponding operation. This design solution provides a subordinate implementation of a rule for determining whether the interaural level difference can be used to determine noise. There may be a plurality of alternatives to a specific determining method, and this is not limited in the present invention.

In one embodiment, the determining, based on the interaural level difference between the two microphones, whether the sound signal includes a rear sound signal includes: for the $y^{th}$ frame, when an interaural level difference corresponding to a $j^{th}$ frequency between the two microphones is less than a second threshold corresponding to the $j^{th}$ frequency, determining that a rear sound signal is included at the $j^{th}$ frequency, where the $j^{th}$ frequency is one of the M frequencies, and j is any positive integer not greater than M; or when an interaural level difference corresponding to a $j^{th}$ frequency between the two microphones is not less than a second threshold, determining that a rear sound signal is not included at the $j^{th}$ frequency.

This step may be performed by a determining module. More specifically, this technology may be implemented by a processor invoking a program and an instruction stored in a memory to perform a corresponding operation. This design solution provides a manner of finally determining noise by using the interaural level difference, to accurately identify a rear sound signal. The second threshold may be set as required based on an empirical value.

In one embodiment, the filtering out the rear sound signal from the sound signal includes:

if a camera currently being used by the terminal for shooting is a front camera, controlling an adaptive filter of the terminal to filter out, by using a sound signal collected by the rear top microphone as a reference signal, the rear sound signal from a sound signal collected by the front top microphone in the $y^{th}$ frame; or if a camera currently being used by the terminal for shooting is a rear camera, controlling an adaptive filter of the terminal to filter out, by using a sound signal collected by the front top microphone as a reference signal, the rear sound signal from a sound signal collected by the rear top microphone in the $y^{th}$ frame.

This step may be performed by a filtering module. More specifically, this technology may be implemented by a processor invoking a program and an instruction stored in a memory to perform a corresponding operation. This design solution provides a method for noise processing for cameras at different locations.

In one embodiment, if the terminal further includes a third microphone at the bottom of the terminal, a location of the third microphone at the bottom is not limited, and the front camera is being used for shooting, the method further includes:

performing delay difference localization on sound signals collected by the third microphone and the front top microphone in the $y^{th}$ frame, to obtain a longitudinal azimuth of the sound signals in the $y^{th}$ frame;

when the longitudinal azimuth is greater than a preset first angle, determining that the sound signal in the $y^{th}$ frame includes a secondary-noise signal, where, in this case, the secondary-noise signal is a noise signal located in front of the front camera and beyond a shooting range of the front camera; and if it is determined that the sound signal in the $y^{th}$ frame includes a secondary-noise signal, controlling the adaptive filter of the terminal to filter out, by using a sound signal collected by the rear top microphone as a reference signal, the secondary-noise signal from the sound signal collected by the front top microphone in the $y^{th}$ frame.

In one embodiment, the apparatus may further include a secondary-noise filtering module, configured to perform the foregoing method. More specifically, this technology may be implemented by a processor invoking a program and an instruction stored in a memory to perform a corresponding operation. This design solution provides a method for processing secondary noise when a microphone exists at the bottom.

In one embodiment, if the terminal further includes a fourth microphone at the bottom of the terminal, the third microphone and the fourth microphone are arranged on the left and right at the bottom of the terminal, and their specific locations are not limited, the method further includes:

performing delay difference localization on sound signals collected by the third microphone and the fourth microphone in the $y^{th}$ frame, to obtain a transverse azimuth of the sound signals in the $y^{th}$ frame;

when the transverse azimuth is greater than a preset second angle, determining that the sound signal in the $y^{th}$ frame includes a secondary-noise signal; and if it is determined that the sound signal in the $y^{th}$ frame includes a secondary-noise signal, controlling the adaptive filter of the terminal to filter out, by using a sound signal collected by the rear top microphone as a reference signal, the secondary-noise signal from the sound signal collected by the front top microphone in the $y^{th}$ frame. It is worth noting that the secondary-noise signal can be determined by using either the longitudinal azimuth or the transverse azimuth, except that focused sound source azimuths are different. The two may be complementary to each other, so that it is more comprehensive and accurate than determining the secondary-noise signal by only using the longitudinal azimuth or the transverse azimuth.

In one embodiment, the apparatus may further include a secondary-noise filtering module, configured to perform the foregoing method. More specifically, this technology may be implemented by a processor invoking a program and an instruction stored in a memory to perform a corresponding operation. This design solution provides a method for processing secondary noise when two microphones exist at the bottom.

In one embodiment, if the terminal further includes a third microphone at the bottom of the terminal, a location of the third microphone at the bottom is not limited, and the rear camera is being used for shooting, the method further includes:

performing delay difference localization on sound signals collected by the third microphone and the rear top microphone in the $y^{th}$ frame, to obtain a longitudinal azimuth of the sound signals in the $y^{th}$ frame;

when the longitudinal azimuth is greater than a preset first angle, determining that the sound signal in the $y^{th}$ frame includes a secondary-noise signal, where, in this case, the secondary-noise signal is a noise signal located in front of the rear camera and beyond a shooting range of the rear camera; and if it is determined that the sound signal in the $y^{th}$ frame includes a secondary-noise signal, controlling the adaptive filter of the terminal to filter out, by using a sound signal collected by the front top microphone as a reference signal, the secondary-noise signal from the sound signal collected by the rear top microphone in the $y^{th}$ frame.

In one embodiment, the apparatus may further include a secondary-noise filtering module, configured to perform the foregoing method. More specifically, this technology may be implemented by a processor invoking a program and an instruction stored in a memory to perform a corresponding operation. This design solution provides a method for processing secondary noise when a microphone exists at the bottom.

In one embodiment, if the terminal further includes a fourth microphone at the bottom of the terminal, and the third microphone and the fourth microphone are arranged on the left and right at the bottom of the terminal, the method further includes:

performing delay difference localization on sound signals collected by the third microphone and the fourth microphone in the $y^{th}$ frame, to obtain a transverse azimuth of the sound signals in the $y^{th}$ frame;

when the transverse azimuth is greater than a preset second angle, determining that the sound signal in the $y^{th}$ frame includes a secondary-noise signal; and if it is determined that the sound signal in the $y^{th}$ frame includes a secondary-noise signal, controlling the adaptive filter of the terminal to filter out, by using a sound signal collected by the front top microphone as a reference signal, the secondary-noise signal from the sound signal collected by the rear top microphone in the $y^{th}$ frame. It is worth noting that the secondary-noise signal can be determined by using either the longitudinal azimuth or the transverse azimuth, except that focused sound source azimuths are different. The two may be complementary to each other, so that it is more comprehensive and accurate than determining the secondary-noise signal by only using the longitudinal azimuth or the transverse azimuth.

In one embodiment, the apparatus may further include a secondary-noise filtering module, configured to perform the foregoing method. More specifically, this technology may be implemented by a processor invoking a program and an instruction stored in a memory to perform a corresponding operation. This design solution provides a method for processing secondary noise when two microphones exist at the bottom.

According to a third aspect, an embodiment of the present invention provides a sound processing terminal device. The device is applied to a non-video-call scenario, and the device includes: two microphones at the top of the device, a camera, a memory, and a processor, where the two top microphones, the camera, the memory, and the processor are connected by using a bus, and the two top microphones are located respectively in the front and at the back of the device;

the two top microphones each are configured to collect a sound signal under the control of the processor;

the camera is configured to collect an image signal under the control of the processor;

the memory is configured to store a computer program and an instruction; and the processor is configured to invoke the computer program and the instruction stored in the memory, to perform the method according to any one of the foregoing possible designs.

In one embodiment, the terminal device further includes an antenna system, the antenna system sends or receives a wireless communication signal under the control of the processor, to implement wireless communication with a mobile communications network, and the mobile communications network includes one or more of the following: a GSM network, a CDMA network, a 3G network, an FDMA network, a TDMA network, a PDC network, a TACS network, an AMPS network, a WCDMA network, a TDSCDMA network, a Wi-Fi network, and an LTE network.

In addition, the foregoing method, apparatus, and device may also be applied to a video call scenario, especially a video call scenario in which whether there is a specific user does not need to be identified.

The foregoing method, apparatus, and device may be applied to both a scenario in which shooting is performed by using shooting software of a terminal, and a scenario in which shooting is performed by using third-party shooting software that is run in a terminal, where the shooting includes a plurality of shooting manners, such as common shooting, selfie, a video call, a video conference, VR photographing, and aerial photography.

According to the foregoing solutions, in the embodiments of the present invention, when the terminal is in a shooting state, in a low signal-to-noise ratio scenario, a direction of a sound source is determined by using a method based on an interaural level difference. This can effectively determine noise and suppress the noise, to improve accuracy in picking up a target sound source during shooting, thereby improving user experience.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

In the embodiments of the present invention, a terminal device may be a device that provides a user with voice and/or data connectivity, or a handheld device having a wireless connection function, or another processing device connected to a wireless modem, for example, a mobile phone (or referred to as a "cellular" phone); or may be a portable, pocket-sized, handheld, or wearable device (such as a smartwatch, or a smart band), a tablet, a personal computer (PC, Personal Computer), a PDA (Personal Digital Assistant, personal digital assistant), a POS (Point of Sales, point of sales), a vehicle-mounted computer, or the like.

Figure 1:
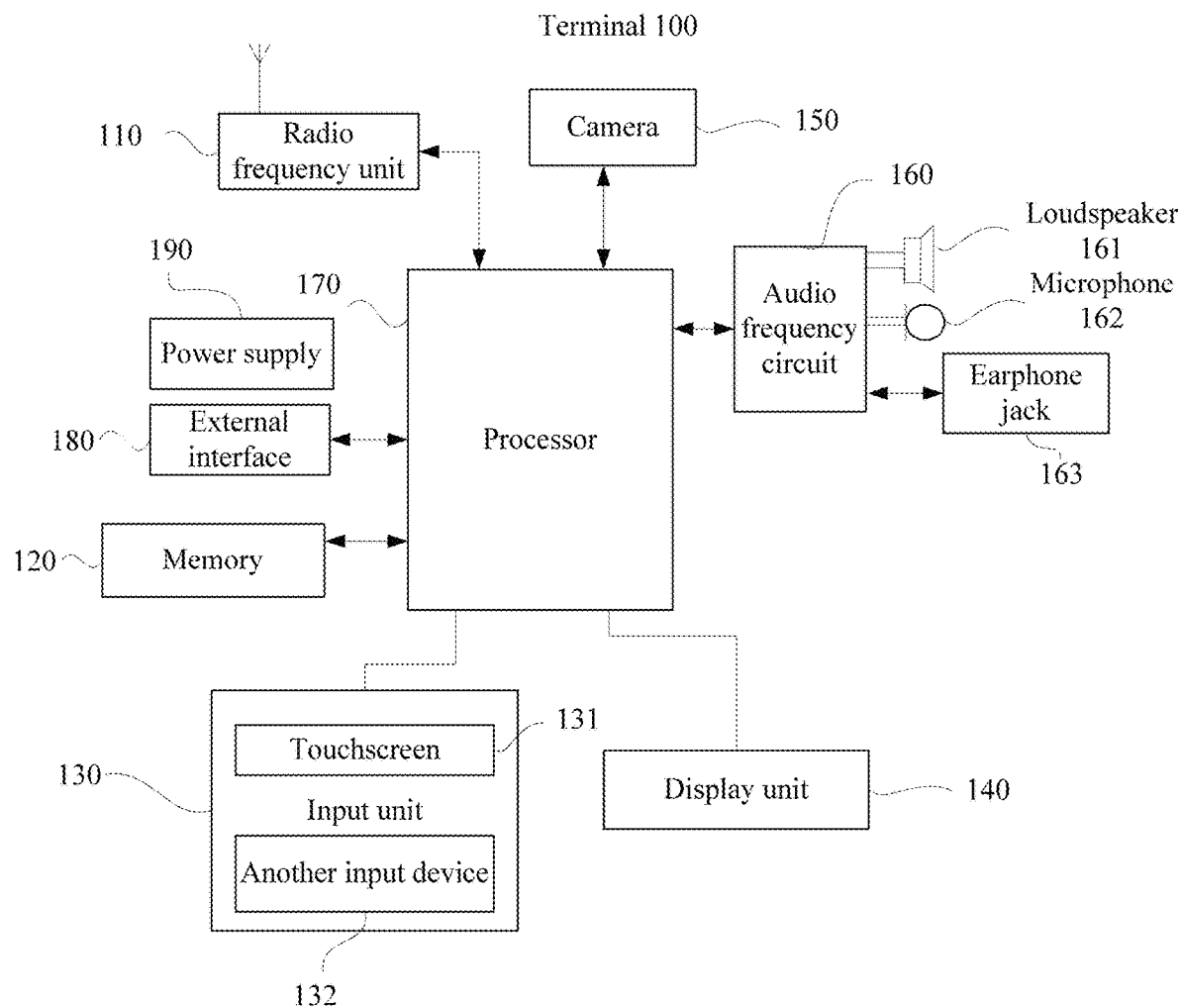
FIG. 1 is a schematic structural diagram of a terminal.

FIG. 1 is a schematic diagram of an optional hardware structure of a terminal 100.

As shown in FIG. 1, the terminal 100 may include components, such as a radio frequency unit 110, a memory 120, an input unit 130, a display unit 140, a camera 150, an audio frequency circuit 160, a loudspeaker 161, a microphone 162, a processor 170, an external interface 180, and a power supply 190. The microphone 162 may be an analog microphone or a digital microphone, and can implement a common pickup function of a microphone. There are at least two microphones, and a layout of the microphones needs to meet a specific requirement. For details, refer to several layout manners shown in FIG. 2A (where there are two microphones in total: a front microphone and a rear microphone at the top of the terminal), FIG. 2B (where there are three microphones in total: a front microphone and a rear microphone at the top of the terminal, and a microphone at the bottom of the terminal), and FIG. 2C (where there are four microphones in total: a front microphone and a rear microphone at the top of the terminal, and a left microphone and a right microphone at the bottom of the terminal). Certainly, another layout may be included. Sound data collected by a bottom microphone may be obtained by using an operating system, to implement a basic call function.

A person skilled in the art may understand that, FIG. 1 is merely an example of a portable multi-function apparatus, and shall not be construed as any limitation on the portable multi-function apparatus. The apparatus may include more or fewer components than those shown in the figure, or combine some components or different components.

The input unit 130 may be configured to receive input digit or character information, and generate a key signal input related to user setting and functional control of the portable multi-function apparatus. Specifically, the input unit 130 may include a touchscreen 131 and another input device 132. The touchscreen 131 can collect a touch operation of a user (for example, an operation of the user on the touchscreen or near the touchscreen by using a finger, a joint, or any proper object such as a stylus) on or near the touchscreen, and drive a corresponding connection apparatus based on a preset program. The touchscreen can detect a touch action of a user on the touchscreen, convert the touch action into a touch signal, and send the touch signal to the processor 170; and can receive a command sent by the processor 170 and execute the command, where the touch signal includes at least touch point coordinate information. The touchscreen 131 may provide an input interface and an output interface between the terminal 100 and a user. In addition, the touchscreen may be implemented by a plurality of types, such as a resistive touchscreen, a capacitive touchscreen, an infrared touchscreen, and a surface acoustic wave touchscreen. The input unit 130 may further include another input device in addition to the touchscreen 131. Specifically, the another input device 132 may include but is not limited to one or more of the following: a physical keypad, a function key (for example, a volume control key 132 or a switch key 133), a trackball, a mouse, a joystick, or the like.

The display unit 140 may be configured to display information input by a user or information provided for a user and various menus of the terminal 100. Further, the touchscreen 131 may cover a display panel 141. After detecting a touch operation on or near the touchscreen 131, the touchscreen 131 transfers the touch operation to the processor 170 to determine a type of a touch event, and then the processor 170 provides a corresponding visual output on the display panel 141 based on the type of the touch event. In this embodiment, the touchscreen and the display unit may be integrated into one component to implement input, output, and display functions of the terminal 100. For ease of description, in this embodiment of the present invention, a touch display screen represents a function set of the touchscreen and the display unit; and in some embodiments, the touchscreen and the display unit may alternatively serve as two independent components.

The memory 120 may be configured to store an instruction and data. The memory 120 may mainly include an instruction storage area and a data storage area, where the data storage area may store an association relationship between a joint touch gesture and an application function; and the instruction storage area may store an operating system, an application, and a software unit such as an instruction required by at least one function, or their subsets or extended sets. The memory 120 may further include a nonvolatile random access memory, and provide the processor 170 with the following: management of hardware, software, and data resources of a computing and processing device, and support for control software and applications. The memory 120 is further configured to store a multimedia file, and store an operating program and application.

As a control center of the terminal 100, the processor 170 connects all parts of the entire mobile phone/terminal by using various interfaces and lines, and performs various functions and data processing of the terminal 100 by running or executing an instruction stored in the memory 120 and invoking data stored in the memory 120, so as to perform overall monitoring on the mobile phone. Optionally, the processor 170 may include one or more processing units. An application processor and a modem processor may be integrated into the processor 170. The application processor mainly handles an operating system, a user interface, an application, and the like. The modem processor mainly handles wireless communication. It may be understood that, the modem processor may not be integrated into the processor 170. In some embodiments, the processor and the memory may be implemented on a single chip; or in some embodiments, they may be implemented separately on separate chips. The processor 170 may be further configured to generate a corresponding operation control signal, send the signal to a corresponding part of the computing and processing device, and read and process data in software, especially the data and program in the memory 120, so that each function module of the computing and processing device performs a corresponding function, so as to control the corresponding component to act as required by an instruction.

The camera 150 is configured to collect an image or a video, and may be triggered and enabled by using an application program instruction, to implement a photographing or shooting function.

The radio frequency unit 110 may be configured to receive or send a signal in an information receiving or sending process or a call process, and, in particular, after receiving downlink information from a base station, send the downlink information to the processor 170 for processing; and send uplink-related data to the base station. Generally, a radio frequency unit includes but is not limited to: an antenna, at least one amplifier, a transceiver, a coupler, a low noise amplifier (LNA), a duplexer, or the like. In addition, the radio frequency unit 110 may further communicate with a network device or another device through wireless communication. The wireless communication may use any communications standard or protocol, including but not limited to: a global system for mobile communications (GSM), general packet radio service (GPRS), code division multiple access (CDMA), wideband code division multiple access (WCDMA), long term evolution (LTE), email, short message service (SMS), and the like.

The audio frequency circuit 160, the loudspeaker 161, and the microphone 162 may provide an audio interface between a user and the terminal 100. The audio frequency circuit 160 may transmit, to the loudspeaker 161, an electrical signal converted from received audio data, and the loudspeaker 161 converts the electrical signal into a sound signal for outputting. In addition, the microphone 162 is configured to collect the sound signal and may further convert the collected sound signal into an electrical signal; and the audio frequency circuit 160 converts the electrical signal into audio data after receiving the electrical signal and outputs the audio data to the processor 170 for processing, and then the audio data is sent to, for example, another terminal, after passing through the radio frequency unit 110, or the audio data is output to the memory 120 for further processing. The audio frequency circuit may also include an earphone jack 163 for providing a connection interface between the audio frequency circuit and an earphone.

The terminal 100 further includes the power supply 190 (for example, a battery) that supplies power to each component. The power supply may be logically connected to the processor 170 through a power supply management system, to implement functions such as charging management, discharging management, and power consumption management through the power supply management system.

The terminal 100 further includes the external interface 180, where the external interface 180 may be a standard Micro USB interface, or a multi-pin connector, and may be configured to connect the terminal to another apparatus for communication, or may be configured to connect a charger to charge the terminal 100.

Although not shown in the figure, the terminal 100 may further include a camera flash, a wireless fidelity (Wi-Fi) module, a Bluetooth module, various sensors, and the like. Details are not described herein again.

In some scenarios, when a user uses a mobile terminal such as a mobile phone to perform video recording or real-time shooting, the user usually expects that a shot video does not include a sound from behind a camera. However, in an environment in which a signal-to-noise ratio is relatively low, an interference noise source from behind the camera may be easily identified as a sound source within a shooting range of the camera, causing erroneous determining in sound source localization and relatively poor accuracy. Therefore, the embodiments of the present invention provide a sound processing method and apparatus, to improve accuracy in sound source localization, reduce erroneous determining, and effectively filter out noise, which may be referred to as a rear sound signal in the embodiments of the present invention, from behind the camera. For description, a plane on which a main body of the terminal is located is a boundary, and noise whose sound source is located in an area behind the camera (for example, for a front camera, an area behind the front camera may be understood as an area on a back side of the main body, where the area on the back side of the main body cannot be shot by the front camera; or, for example, for a rear camera, an area behind the rear camera may be understood as an area on a front side of the main body, where the area on the front side of the main body cannot be shot by the rear camera) may be understood as a rear sound signal. The area mentioned above allows for a specific demarcation error.

Figure 2A:
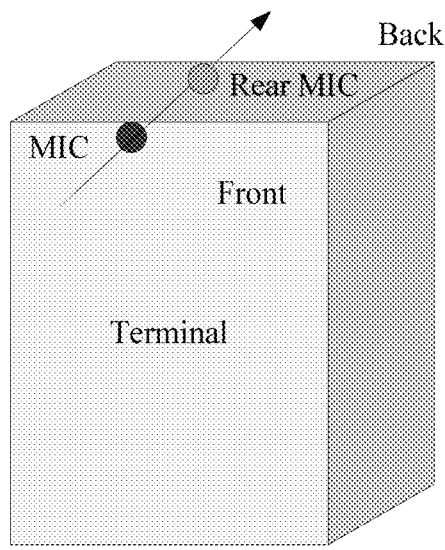
FIG. 2A, FIG. 2B, or FIG. 2C is a schematic diagram of a layout of microphones (MIC) in a terminal according to an embodiment of the present invention.
Figure 2B:
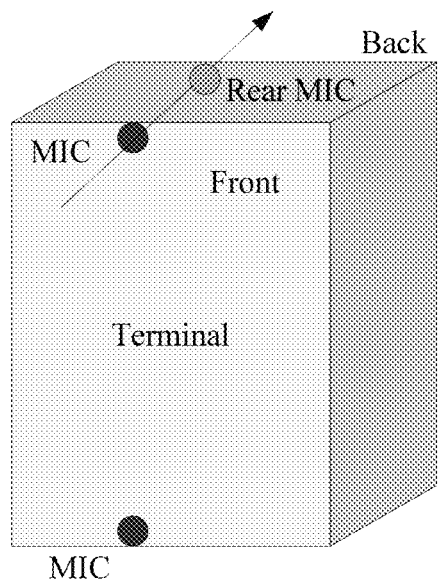
Figure 2C:
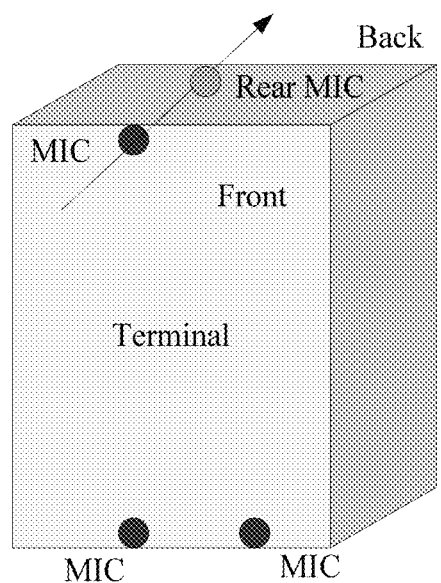
Figure 3:
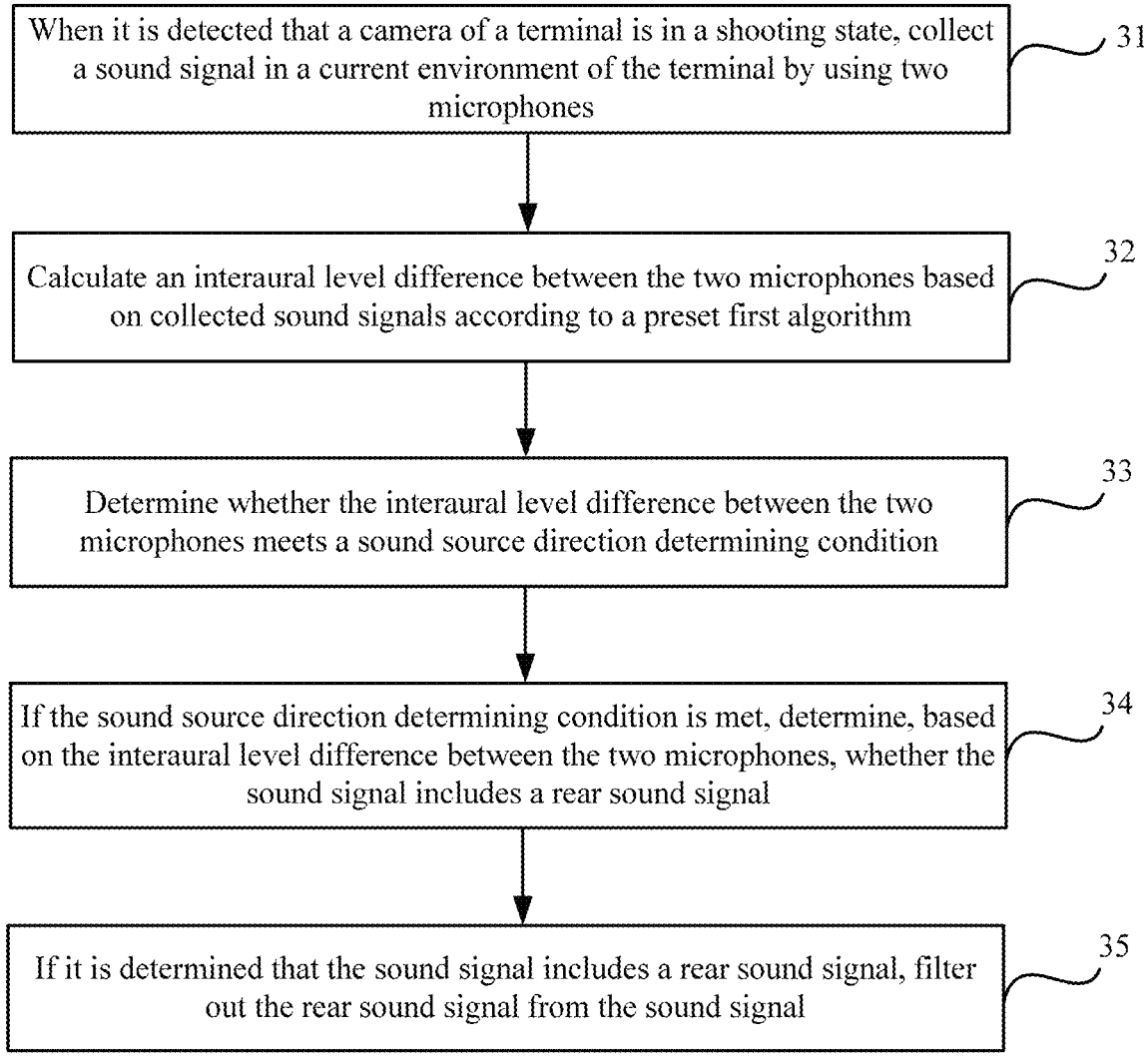
FIG. 3 is a flowchart of a sound processing method according to an embodiment of the present invention.

As shown in FIG. 3, an embodiment of the present invention provides a sound processing method, where the method may be applied to a terminal equipped with two microphones at the top of the terminal, the two microphones are located respectively in the front and at the back of the terminal, and the method is applied to a non-video-call scenario. The terminal may be the terminal 100 shown in FIG. 1, and a microphone arrangement manner may be any layout shown in FIG. 2A, FIG. 2B, or FIG. 2C. A specific procedure includes the following operations.

Operation 31: When it is detected that a camera of the terminal is in a shooting state, collect a sound signal in a current environment of the terminal by using the two microphones.

Operation 32: Calculate an interaural level difference between the two microphones based on collected sound signals according to a preset first algorithm. In time domain, the sound signal may be precisely divided into frame signals (briefly referred to as frames) of a sound in a signal processing process. A length of a frame is related to a preset division algorithm, so each frame has a corresponding sound signal. Therefore, operation 31 may be understood as follows: when a microphone is in a working state, the microphone can collect consecutive sound frame signals in the current environment.

During specific calculation processing, the collected sound signals may be divided into at least one frame based on a preset time interval; and then calculation is performed on each frame or any one of the frames, to obtain an interaural level difference corresponding to a $y^{th}$ frame between the two microphones, where the $y^{th}$ frame is any frame of the at least one frame. For ease of description, the $y^{th}$ frame may be a sound frame signal on which calculation processing is currently performed. Usually, for an entire sound signal, same processing as that performed in this embodiment of the present invention needs to be performed on each frame of the sound signal. Certainly, if a precision requirement is not high, same processing as that performed in this embodiment of the present invention may be performed on some frames of the sound signal. Therefore, the $y^{th}$ frame in this application is not limited to a specific frame of the sound signal, and may represent a type of frame processed in a same manner.

Operation 33: Determine whether the interaural level difference between the two microphones meets a sound source direction determining condition.

Operation 34: If the sound source direction determining condition is met, determine, based on the interaural level difference between the two microphones, whether the sound signal includes a rear sound signal, where the rear sound signal is a sound signal whose sound source is located behind a plane on which a main body of the terminal is located, and the camera cannot shoot an area behind the plane on which the main body of the terminal is located. The rear sound signal may be understood as a noise signal.

Operation 35: If it is determined that the sound signal includes a rear sound signal, filter out the rear sound signal from the sound signal.

Specifically, operation 31 and operation 32 may be implemented in the following processes:

The terminal may identify, by using a preset detection program, whether the camera is in an enabled state, for example, detect whether the camera is enabled, and once it is detected that the camera is in a shooting state, the terminal uses the front microphone and the rear microphone at the top of terminal to collect a sound signal in the current environment. Theoretically, sound signals in the $y^{th}$ frame may be denoted as S1 and S2; power spectrums of S1 and S2 are calculated by using a fast Fourier transform (FFT) algorithm, and are $P_1$ and $P_2$ respectively; and the interaural level difference between the two microphones is calculated based on $P_1$ and $P_2$. A person skilled in the art should be aware that a sound signal includes a plurality of frame signals. In addition, if the terminal has two cameras, in a specific implementation process of operation 31, when it is detected that a camera is enabled, it is usually also detected that the terminal is using a front camera or a rear camera, so that a processor can choose an appropriate algorithm, based on a location of the camera, for subsequent signal processing.

A specific implementation process is as follows:

First, the sound signals collected by the two microphones are sent to an FFT module, where the FFT module is responsible for performing time-frequency conversion on the collected sound signals, to obtain frequency spectrums of the signals. Specifically, the FFT module processes the signals by using short-time Fourier transform (Short-Time Fourier Transform, STFT).

Herein, two microphones, a front top microphone and a rear top microphone, are used as an example. It is assumed that a sound signal picked up by each of the two microphones is $x_i(n)$, where i=1, 2; when the front camera is being used, i=1, 2 indicates the front microphone and the rear microphone respectively; or when the rear camera is being used, i=1, 2 indicates the rear microphone and the front microphone respectively; and n is a quantity of sample points of a frame of signals. Using an 8 k sample rate and a 10 ms frame length as an example, n is equal to 80. A signal $x_i(N, l)$ is obtained after Fourier transform, where N represents a transmit frequency corresponding to a frame of signals, and l represents a frame number. A power spectrum of the signal is $P_i(k,l)=20\log_{10}|X_i^2(k,l)|$. The interaural level difference (interaural level difference, ILD) corresponding to the $y^{th}$ frame between the two microphones is calculated by using the following formula:

$$ILD_{now} = \frac{P_1 - P_2}{P_1 + P_2}$$

That the front camera is being used for shooting is used as an example herein. (A principle is similar when the rear camera is being used for shooting.) $P_1$ represents a corresponding sound power spectrum of the front top microphone in the $y^{th}$ frame, $P_2$ represents a corresponding sound power spectrum of the rear top microphone in the $y^{th}$ frame, both $P_1$ and $P_2$ are vectors each having N elements, the N elements are values of corresponding N frequencies after fast Fourier transform is performed on the sound signal in the $y^{th}$ frame, N is an integer greater than 1, $ILD_{now}$ is a vector including interaural level differences corresponding to the N frequencies, and a value of N is determined by a preset frequency planning rule. The algorithm in the foregoing example is merely an implementation form of the preset first algorithm rather than a limitation.

Figure 4A:
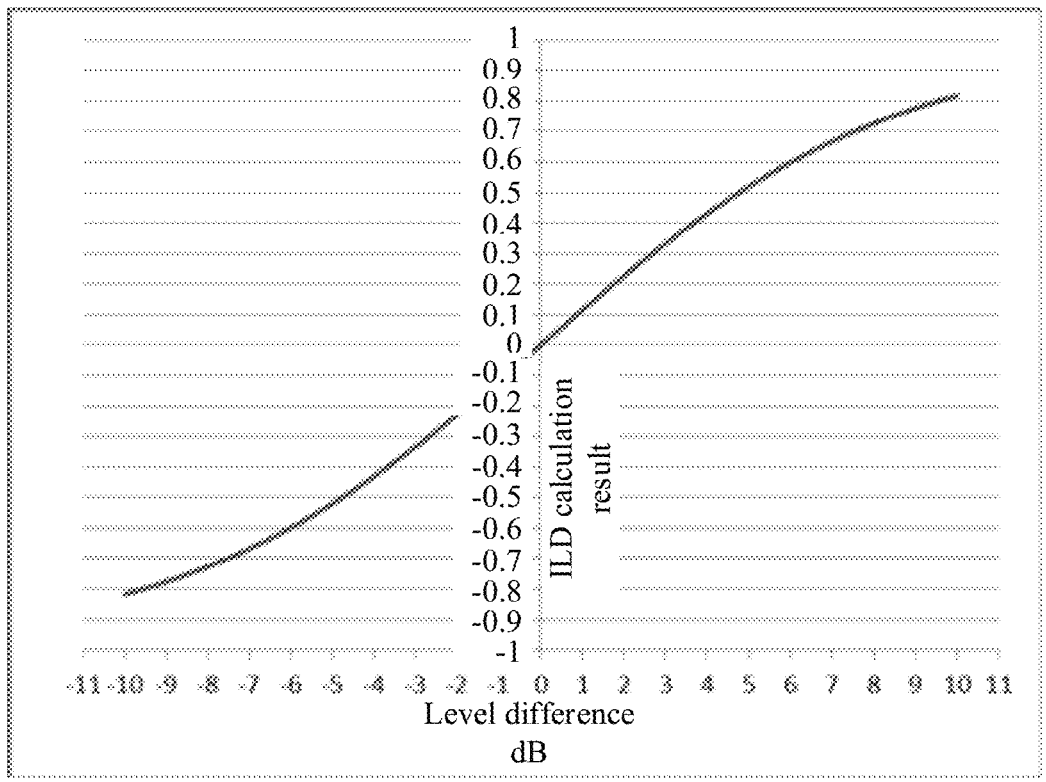
FIG. 4A is a schematic diagram of a relationship between an ILD and an energy difference in dB between a front microphone and a rear microphone of a terminal.

FIG. 4A shows a relationship between an ILD and an energy difference in decibels (dB) between the front top microphone and the rear top microphone.

As shown in FIG. 4A, a value of an ILD ranges from −1 to 1.1 indicates that, in the $y^{th}$ frame, energy of the front top microphone is remarkably greater than energy of the rear top microphone, and a sound signal is a front sound signal. −1 indicates that, in the $y^{th}$ frame, energy of the rear top microphone is remarkably greater than energy of the front top microphone, and a sound signal is a rear sound signal.

However, determining a rear sound signal by using the interaural level difference is more accurate only when the interaural level difference meets a specific condition. Specifically, the determining whether the interaural level difference between the two microphones meets a sound source direction determining condition in operation 33 includes the following process:

calculate, by using an interaural level difference that is between the two microphones and that corresponds to a frequency on which calculation processing is currently performed, a maximum value and a minimum value of an interaural level difference corresponding to a current frequency between the two microphones; and when a difference between the maximum value and the minimum value of the interaural level difference corresponding to the current frequency between the two microphones is greater than a first threshold, determine that the sound source direction determining condition is met by the interaural level difference at the current frequency; or when a difference between the maximum value of the interaural level difference and the minimum value of the interaural level difference is not greater than a first threshold, determine that the sound source direction determining condition is not met by the interaural level difference at the current frequency. If, in a frame of signals, the sound source direction determining condition is met at M frequencies of the N frequencies, it is determined that the interaural level difference between the two microphones in the $y^{th}$ frame meets the sound source direction determining condition, where M is greater than or equal to N/2. In other words, in the $y^{th}$ frame, whether a rear sound signal exists may be determined by using the interaural level difference.

Herein, $ILD_{max}$ represents a maximum value of an interaural level difference corresponding to an $i^{th}$ frequency (one of frequencies corresponding to the $y^{th}$ frame), and $ILD_{min}$ represents a minimum value of the interaural level difference corresponding to the $i^{th}$ frequency. At the $1^{st}$ frequency of an initial frame, $ILD_{max}$ and $ILD_{min}$ may be set to 0 or may be set to a preset interaural level difference between the front top microphone and the rear top microphone. Specifically, when $ILD_{max}-ILD_{min}>$the first threshold, is considered that the interaural level difference between the two microphones meets the sound source direction determining condition at the $i^{th}$ frequency; otherwise, it is considered that the sound source direction determining condition is not met at the $i^{th}$ frequency, where $ILD_{max}$ is a maximum interaural level difference value calculated based on the interaural level difference corresponding to the $i^{th}$ frequency between the two microphones, and $ILD_{min}$ is a minimum interaural level difference value calculated based on the interaural level difference corresponding to the $i^{th}$ frequency between the two microphones.

Methods for calculating $ILD_{max}$ and $ILD_{min}$ are as follows:

when the interaural level difference corresponding to the $i^{th}$ frequency between the two microphones is not greater than a maximum value of an interaural level difference corresponding to an $(i-1)^{th}$ frequency (a previous frequency), calculate the maximum value of the interaural level difference corresponding to the $i^{th}$ frequency between the two microphones by using the following formula:

$$ILD_{max}=\alpha_{low}*ILD_{now}+(1-\alpha_{low})*ILD_{max}'; \text{ or}$$

when the interaural level difference corresponding to the $i^{th}$ frequency between the two microphones is greater than a maximum value of an interaural level difference corresponding to an $(i-1)^{th}$ frequency (a previous frequency), calculate the maximum value of the interaural level difference corresponding to the $i^{th}$ frequency between the two microphones by using the following formula:

$$ILD_{max}=\alpha_{fast}*ILD_{now}+(1-\alpha_{fast})*ILD_{max}'; \text{ and}$$

when the interaural level difference corresponding to the $i^{th}$ frequency between the two microphones is greater than a minimum value of the interaural level difference corresponding to the $(i-1)^{th}$ frequency (a previous frequency) between the two microphones, calculate the minimum value of the interaural level difference corresponding to the $i^{th}$ frequency between the two microphones by using the following formula:

$$ILD_{min}=\alpha_{fast}*ILD_{low}+(1-\alpha_{low})*ILD_{min}'; \text{ or}$$

when the interaural level difference corresponding to the $i^{th}$ frequency between the two microphones is not greater than a minimum value of the interaural level difference corresponding to the $(i-1)^{th}$ frequency (a previous frequency), calculate the minimum value of the interaural level difference corresponding to the $i^{th}$ frequency between the two microphones by using the following formula:

$$ILD_{min}=\alpha_{fast}*ILD_{now}+(1-\alpha_{fast})*ILD_{min}'; \text{ where}$$

$ILD_{now}$ represents the interaural level difference corresponding to the $i^{th}$ frequency between the two microphones, $ILD_{max}$ represents the maximum reference value corresponding to the $i^{th}$ frequency, $ILD_{max}'$ represents the maximum reference value corresponding to the $(i-1)^{th}$ frequency, $ILD_{min}$ represents the minimum reference value corresponding to the $i^{th}$ frequency, represents the minimum reference value corresponding to the $(i-1)^{th}$ frequency, $\alpha_{fast}$ and $\alpha_{low}$ represent preset step values, $\alpha_{fast}>\alpha_{low}$, and it is suggested that $\alpha_{fast}$ and $\alpha_{low}$ be set to 0.95 and 0.05 respectively. It can be learned that, ILD_max is obtained based on smoothing of the interaural level difference corresponding to the $i^{th}$ frequency and the maximum value of the interaural level difference corresponding to the previous frequency, and ILD_min is obtained based on smoothing of the interaural level difference corresponding to the $i^{th}$ frequency and the minimum value of the interaural level difference corresponding to the previous frequency.

Further, if the interaural level difference in the $y^{th}$ frame meets the sound source direction determining condition, whether the sound signal in the $y^{th}$ frame includes a rear sound signal is determined based on the interaural level difference between the front top microphone and the rear top microphone of the terminal, and the rear signal is filtered out when it is determined that the sound signal in the $y^{th}$ frame includes a rear sound signal.

In one embodiment, as shown in FIG. 2A, in a layout case in which there is a microphone separately at the front top and the rear top of the terminal, operation 34 may be specifically: when an interaural level difference corresponding to a $j^{th}$ frequency between the two microphones is less than a second threshold, determine that a rear sound signal is included at the $j^{th}$ frequency corresponding to the sound signal; or when an interaural level difference corresponding to a $j^{th}$ frequency between the two microphones is not less than a second threshold, determine that a rear sound signal is not included at the $j^{th}$ frequency corresponding to the sound signal.

Operation 35 may be specifically: when it is determined that a rear sound signal is included at the $j^{th}$ frequency corresponding to the sound signal and a camera currently being used by the terminal for shooting is a front camera, control an adaptive filter of the terminal to filter out, by using a sound signal collected by the rear top microphone as a reference signal, the rear sound signal from a sound signal collected by the front top microphone in the $y^{th}$ frame; or if a camera currently being used by the terminal for shooting is a rear camera, control an adaptive filter of the terminal to filter out, by using a sound signal collected by the front top microphone as a reference signal, the rear sound signal from a sound signal collected by the rear top microphone in the $y^{th}$ frame. For example, an NLMS adaptive filter solution may be used. A frequency domain filter is an equivalent form of a time domain filter.

Principles of signal processing in the two filtering manners may be equivalent to each other. All these belong to the prior art, and details about a filtering process are not described herein.

It is worth noting that, the method may be used by any terminal that includes a front microphone and a rear microphone at its top, for example, a terminal shown in 2B or a terminal shown in 2C.

However, usually a field-of-view range within which the camera is capable of shooting is about 120 degrees, but not an entire front area of the camera. Therefore, there may further be a noise signal whose sound source is located in front of the camera and beyond a shooting range of the camera, where this noise signal has a less impact on photographed content than the rear sound signal, and may be defined as a secondary-noise signal. The area mentioned above allows for a specific demarcation error. In addition, for a supplementary explanation, a spatial range of a sound source of the secondary-noise signal and the rear sound signal each mentioned in the present invention may be determined by a person skilled in the art based on an empirical value, or may be determined by parameters of the camera and the terminal. Therefore, in a specific implementation process, in addition to filtering out the portion of noise in the rear sound signal, the secondary noise may be further filtered out. Reference may be made to the following two examples.

Example 1

A layout case in which there is a microphone separately at the front top, the rear top, and the bottom of the terminal. The following uses, as an example, a layout case in which there is a microphone separately at the front top, the rear top, and the bottom left of the terminal. As shown in FIG. 2B, in this case, regardless of whether a rear sound signal existed previously, the sound processing method may further include the following operation.

Operation 36: If a front camera is being used for shooting, delay difference localization may be further performed on sound signals collected by a bottom left microphone and the front top microphone, to obtain a longitudinal azimuth of the sound signals; when the longitudinal azimuth is greater than a preset first angle, determine that the sound signal in a $y^{th}$ frame includes a secondary-noise signal, where the secondary-noise signal is a noise signal located in front of the front camera and beyond a boundary of a shooting range of the front camera; and if it is determined that the sound signal in the $y^{th}$ frame includes a secondary-noise signal, control an adaptive filter of the terminal to filter out, by using a sound signal collected by the rear top microphone as a reference signal, the secondary-noise signal from a sound signal collected by the front top microphone in the $y^{th}$ frame.

If a rear camera is being used for shooting, delay difference localization may be further performed on sound signals collected by a bottom left microphone and the rear top microphone, to obtain a longitudinal azimuth of the sound signals; when the longitudinal azimuth is greater than a preset first angle (which may be the same as or different from the preset first angle in the previous paragraph), it is determined that the sound signal in a $y^{th}$ frame includes a secondary-noise signal. In this case, the secondary-noise signal is a noise signal located in front of the rear camera and beyond a boundary of a shooting range of the rear camera. If it is determined that the sound signal in the $y^{th}$ frame includes a secondary-noise signal, an adaptive filter of the terminal is controlled to filter out, by using a sound signal collected by the front top microphone as a reference signal, the secondary-noise signal from a sound signal collected by the rear top microphone in the $y^{th}$ frame.

In one embodiment, a principle of implementation of a layout case in which there is a microphone separately at the front top, the rear top, and the bottom right of the terminal is quite similar to the foregoing implementation principle. A person skilled in the art may readily implement a similar implementation based on this embodiment of the present invention, and details are not described herein.

Example 2

In a layout case in which there is a microphone separately at the front top, the rear top, the bottom left, and the bottom right of the terminal, for ease of reference, the two bottom microphones may also be referred to as a third microphone and a fourth microphone. As shown in FIG. 2C, in this case, regardless of whether a rear sound signal existed previously, the sound processing method may further include the following operation.

Operation 37: If a front camera is being used for shooting, delay difference localization may be further performed on sound signals collected by a bottom left microphone and the front top microphone, to obtain a longitudinal azimuth of the sound signals; and when the longitudinal azimuth is greater than a preset first angle, determine that the sound signal in a $y^{th}$ frame includes a secondary-noise signal, where the secondary-noise signal is a noise signal located in front of the front camera and beyond a boundary of a shooting range of the front camera. Further, delay difference localization is further performed on sound signals collected by the third microphone and the fourth microphone in the $y^{th}$ frame, to obtain a transverse azimuth of the sound signals in the $y^{th}$ frame; and when the transverse azimuth is greater than a preset second angle, it is determined that the sound signal in the $y^{th}$ frame includes a secondary-noise signal. In the foregoing step, if it is determined that the sound signal in the $y^{th}$ frame includes a secondary-noise signal, an adaptive filter of the terminal is controlled to filter out, by using a sound signal collected by the rear top microphone as a reference signal, all secondary-noise signals from a sound signal collected by the front top microphone in the $y^{th}$ frame. In addition, noise that can be detected by using the longitudinal azimuth and noise that can be detected by the transverse azimuth both belong to secondary-noise signals, but focused azimuths of noise sources are slightly different. For example, the longitudinal azimuth focuses more on detection of noise, in a longitudinal direction, of a plane on which the terminal is located, whereas the transverse azimuth focuses more on detection of noise, in a transverse direction, of the plane on which the terminal is located.

If a rear camera is being used for shooting, delay difference localization may be further performed on sound signals collected by a bottom left microphone and the rear top microphone, to obtain a longitudinal azimuth of the sound signals; and when the longitudinal azimuth is greater than a preset first angle, it is determined that the sound signal in a $y^{th}$ frame includes a secondary-noise signal. In this case, the secondary-noise signal is a noise signal located in front of the rear camera and beyond a boundary of a shooting range of the rear camera. Further, delay difference localization may be further performed on sound signals collected by the third microphone and the fourth microphone in the $y^{th}$ frame, to obtain a transverse azimuth of the sound signals in the $y^{th}$ frame; and when the transverse azimuth is greater than a preset second angle (which may be the same as or different from the preset second angle in the previous paragraph), it is determined that the sound signal in the $y^{th}$ frame includes a secondary-noise signal. In the foregoing step, if it is determined that the sound signal in the $y^{th}$ frame includes a secondary-noise signal, an adaptive filter of the terminal is controlled to filter out, by using a sound signal collected by the front top microphone as a reference signal, all secondary-noise signals from a sound signal collected by the rear top microphone in the $y^{th}$ frame. In addition, noise that can be detected by using the longitudinal azimuth and noise that can be detected by the transverse azimuth both belong to secondary-noise signals, but focused azimuths of noise sources are slightly different. For example, the longitudinal azimuth focuses more on detection of noise, in a longitudinal direction, of a plane on which the terminal is located, whereas the transverse azimuth focuses more on detection of noise, in a transverse direction, of the plane on which the terminal is located.

It can be learned that, sound source azimuth estimation in a front direction and a back direction may be performed by using information about an interaural level difference between the two microphones in the front and at the back of the terminal. In addition, sound source azimuth estimation in the front direction and the back direction may be alternatively performed by using information about a delay difference, for example, $\theta_1$ (a front-back azimuth) shown in FIG. 4B, that is, an angle value obtained through azimuth estimation performed by using a delay difference between a front microphone and a rear microphone. The front microphone and the rear microphone mean the front top microphone and the rear top microphone respectively. For a specific calculation method, refer to a method for calculating a delay difference in FIG. 5. The method for calculating a delay difference belongs to the prior art, and details are not described in the present invention.

Figure 4B:
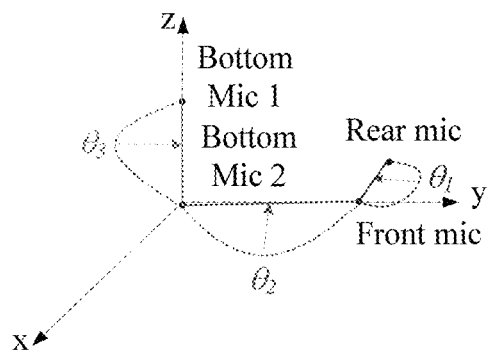
FIG. 4B is a schematic diagram of determining a direction of a sound source by using a microphone for sound source localization.

When there is a microphone at the bottom, a microphone layout is similar to that in FIG. 2B. A left microphone is added at the bottom, represented as Mic 2 in FIG. 4B. In this case, $\theta_2$ is calculated based on the bottom Mic 2 and a front microphone by using an azimuth estimation method based on a delay difference. When there are two microphones at the bottom, a microphone layout is similar to that in FIG. 2C. A left microphone and a right microphone, represented as Mic 2 and Mic 1 respectively in FIG. 4B, are added at the bottom. In this case, $\theta_3$ is calculated based on the bottom Mic 1 and the bottom Mic 2 by using an azimuth estimation method based on a delay difference. As shown in FIG. 4B, a front microphone and a rear microphone may perform azimuth analysis based on an x axis among x, y, and z axes in a space coordinate system, the front microphone and the bottom Mic 2 may perform azimuth analysis based on the y axis, and the bottom Mic 1 and the bottom Mic 2 may perform azimuth analysis based on the z axis.

In this case, by using three angle values $\theta_1$, $\theta_2$, and $\theta_3$ (a front-back azimuth, a transverse azimuth, and a longitudinal azimuth), a spatial sound source localization function can be implemented, to determine whether a target sound source is within a shooting range of a camera. The front-back azimuth, the transverse azimuth, and the longitudinal azimuth all use a main body of a mobile phone as a reference. For example, the front-back azimuth is a direction along the front and back of the mobile phone, the transverse azimuth is a direction along two sides of the main body, and the longitudinal azimuth is a direction along the top and bottom of the main body.

A front camera is still used as an example (Note: shooting by using a rear camera is a different scenario, but a solution implementation principle is similar. Therefore, details are not described in the present invention. The example herein is not intended to limit an application scenario, and this is true throughout this specification). It is well known that, a field of view of a camera is presented as two open angles on a terminal, that is, an open angle 1 and an open angle 2 respectively, where the open angle 1 corresponds to a z axis direction, and the open angle 2 corresponds to a y axis direction. According to this algorithm, a signal from a sound source in the front direction is first distinguished from a signal from a sound source in the back direction by using an angle estimation method based on an interaural level difference or a delay difference, and then the open angle of the y axis is constrained by using $\theta_2$. When $\theta_2$ is greater than the open angle 2 of the camera, a sound signal includes a secondary-noise signal in this case. Similarly, when $\theta_3$ is greater than the open angle 1, a sound signal includes a secondary-noise signal. It is worth noting that, the secondary-noise signal is a relatively more superordinate concept, the determining method by using $\theta_2$ and $\theta_3$ is for detection of different secondary-noise azimuths, $\theta_2$ is mainly used to detect secondary noise in a transverse azimuth, $\theta_3$ is mainly used to detect secondary noise in a longitudinal azimuth, $\theta_2$ and $\theta_3$ are complementary to each other in determining a sound source azimuth.

In one embodiment, according to the sound source localization method based on an interaural level difference, when a microphone layout is a case shown in FIG. 2A, it can be determined whether the sound signal in the $y^{th}$ frame includes a rear sound signal. When a rear sound signal is not included in the $y^{th}$ frame of signal, a voice activity detection (VAD) flag is output as 0; or when a rear sound signal is included in the $y^{th}$ frame of signals, it is considered that a noise source is included and then a VAD flag is output as 1. When a microphone layout is a case shown in FIG. 2B or FIG. 2C, it can be determined whether the sound signal in the $y^{th}$ frame includes a rear sound signal. When a rear sound signal is included in the sound signal in the $y^{th}$ frame, a VAD flag is output as 1; or when a rear sound signal is not included in the $y^{th}$ frame of signal, it is further determined whether a secondary-noise signal is included, and if a secondary-noise signal is not included, a VAD flag is output as 0; or if a secondary-noise signal is included, a VAD flag is output as 1. The VAD flag is 0 by default. In sum, if an influence from a rear sound signal and an influence from a secondary-noise signal are both considered, when a current sound signal includes any one of a secondary-noise signal or a rear sound signal, the VAD flag is set to 1. If only an influence from a rear sound signal is considered, once there is a rear sound signal, the VAD flag is set to 1. Obviously, the former is more sensitive to a sound source, and imposes a higher requirement. These may be preconfigured flexibly by a user.

Figure 5:
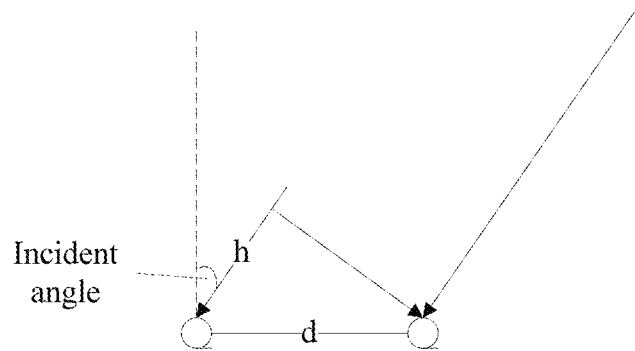
FIG. 5 is a principle diagram of a sound source localization technology based on a phase difference.

It should be noted that, when current ILD information is invalid, that is, when it is determined, by using the interaural level difference between the front top microphone and the rear top microphone, that the sound source direction determining condition is not met, in this case, sound source localization and determining is performed by using a conventional sound source localization technology based on a phase difference. A specific method is as follows:

As shown in FIG. 5, when a far-field sound source signal is incident in parallel, there is a time difference between arrival of the signal at two microphones due to different incident angles. For a waveform signal at any frequency, time difference information is a phase variation of the waveform signal, namely, a phase difference.

When an incident angle is 0°, a phase difference is $$\varphi = 2\pi f \frac{d\sin\theta}{c},$$

where f is a frequency, c is a sound velocity, and d is a microphone spacing. When the incident angle is 0°, φ is equal to 0; or when the incident angle is 180°, φ is equal to π. In FIG. 5, it may be understood that h is a phase difference between the two microphones, d is a maximum phase difference between the two microphones, and the incident angle=a sin (h/d). Herein, the maximum phase difference is $$2\pi f \frac{d}{c},$$

and the phase difference between the two microphones is a phase difference of complex signals of a frequency (where a complex number may be represented, by using a trigonometric function, as x+yi=|A|(cos θ+1 sin θ), and A is a modulus of the complex number).

There are many sound source localization methods based on phase differences of an entire frame. A generalized cross-correlation (GCC) sound source localization method is quite common. A method for implementing GCC is shown in FIG. 6.

Figure 6:
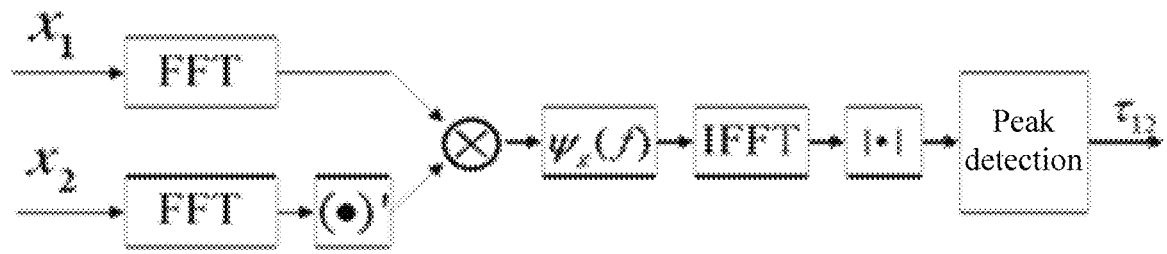
FIG. 6 is a schematic diagram of implementation of a generalized cross-correlation sound source localization method.

In FIG. 6, $x_1$, $x_2$ z indicates time-domain signals received by the two microphones, FFT is fast Fourier transform, and a peak index $\tau_{12}$, namely, a corresponding quantity of delay sample points, is obtained through calculation. Then:

$$\text{Time difference} = \frac{\tau_{12}}{Fs}.$$

The incident angle may be calculated by using the following formula:

$$\text{Incident angle} = \arcsin \tau_{12} \frac{c}{dFs},$$

where c is a sound velocity, d is a microphone spacing, and Fs is a sample rate.

According to the sound source localization method based on a phase difference, the entire $y^{th}$ frame of signals and an incident angle of the $y^{th}$ frame at a frequency can be obtained. When the entire frame and the incident angle at the frequency are both beyond a beam pickup range (where the beam range is preset), it is considered that the sound signal includes a rear sound signal, namely, a noise source, and then a VAD flag is output as 1; or if the sound signals do not include a rear sound signal, a VAD flag is output as 0. The VAD flag is 0 by default.

In one embodiment, when the VAD flag is output as 0, the adaptive filter of the terminal is controlled to filter out, by using a sound signal collected by the rear top microphone as a reference signal, the noise signal from the sound signal collected by the front top microphone. A specific implementation process is as follows: The VAD flag is output to a beamformer, where optionally a normalized least mean square (NLMS) filter is used; and the NLMS filter needs to adaptively generate a desired signal by using a reference signal, deduct a target signal from the desired signal to obtain a residual signal, and use a minimum residual as design guidance. A step length of the NLMS filter is guided by using a result of the foregoing sound source localization. When it is determined that a front sound signal is a target sound source, the step length of the filter is 0 and not updated. When it is determined that a rear sound signal includes a noise source, the step length of the filter is the largest and then updated. Herein, the reference signal of the filter uses a signal in a direction opposite to a direction of a target user. For example, when a speaker is right in front of a screen, a signal collected by the rear top microphone of the terminal is used as the reference signal; or when the speaker is right behind the screen, a signal collected by the front top microphone of the terminal is used as the reference signal. An updated filter coefficient is multiplied by an input (in) signal, to obtain an output signal in which rear noise has been filtered out.

Further, for a signal obtained after beamforming, the sound source localization result is used again to guide post-processing noise reduction after the beamforming. When a sound source localization result of a frequency includes noise, noise energy of the frequency is updated and post-processing gain suppression is performed by using a conventional Wiener filtering algorithm. Noise reduction processing is further performed on the signal obtained after beamforming.

Next, a signal obtained after post processing is sent back to an echo cancellation module further for echo cancellation. Beamforming and post processing already play a function of cancellation of an echo signal to some extent. In this scenario, a horn is usually located at the bottom or back of a mobile phone, and an azimuth of a signal generated by the horn is a noise azimuth. Therefore, compared to a conventional echo cancellation technology, the beamforming and post processing technology with a microphone array makes an echo smaller and easier to be canceled.

A remarkable block effect can be produced because an intermediate frequency signal and a high frequency signal are blocked by the terminal. In a low signal-to-noise ratio or multi-sound-source scenario, delay difference information is already very complex and is a mixture of sound sources at a plurality of azimuths. A result of sound source localization based on a delay difference is random. In this case, interaural level difference information is also mixed, but sound source localization may still be used, provided that a relative interaural level difference, generated by a sound source in front of the terminal and a sound source behind the terminal, exists between the two microphones. In particular, the interaural level difference information is more reliable in a video call scenario in which sound sources such as a speaker and a noise source are not quite far from the terminal.

In one embodiment, a microphone layout of the terminal 100 includes but is not limited to any layout shown in FIG. 2A, FIG. 2B, or FIG. 2C. The microphone layout in FIG. 2A, FIG. 2B, or FIG. 2C is a typical in-line layout. When a quantity of microphones increases, a sound pickup range of a beam may be better distinguished, so that the sound pickup range of the beam is more accurate and spatial 3D sound source localization can be implemented. When the microphone layout in FIG. 2A is used, signals from a front direction and a back direction can be effectively distinguished. When the microphone layout in FIG. 2B is used, because a microphone is added at the bottom (either on the left or right), an azimuth of a sound source in a longitudinal direction of the mobile phone can be distinguished, in addition to effective distinguishing between signals from the front direction and the back direction. When the microphone layout in FIG. 2C is used, because two microphones respectively distributed on the left and right are added at the bottom, an azimuth of a sound source in a longitudinal direction and an azimuth of a sound source in a transverse direction can be distinguished, in addition to effective distinguishing between signals from the front direction and the back direction, to implement spatial 3D sound source localization.

An embodiment of the present invention provides a sound processing method, where the method is applied to a terminal equipped with two microphones at the top of the terminal, the two microphones are located respectively in the front and at the back of the terminal, and the method includes: when it is detected that a camera of the terminal is in a shooting state, collecting a sound signal in a current environment by using the two microphones; calculating an interaural level difference between the two microphones based on collected sound signals according to a preset first algorithm; determining whether the interaural level difference between the two microphones meets a sound source direction determining condition; if the sound source direction determining condition is met, determining, based on the interaural level difference between the two microphones, whether the sound signal includes a rear sound signal, where the rear sound signal is a sound signal whose sound source is located behind the camera; and if it is determined that the sound signal includes a rear sound signal, filtering out the rear sound signal from the sound signal. According to this method, a noise signal beyond a shooting range can be filtered out during shooting, to ensure voice quality of a video during shooting, thereby improving user experience.

Figure 7:
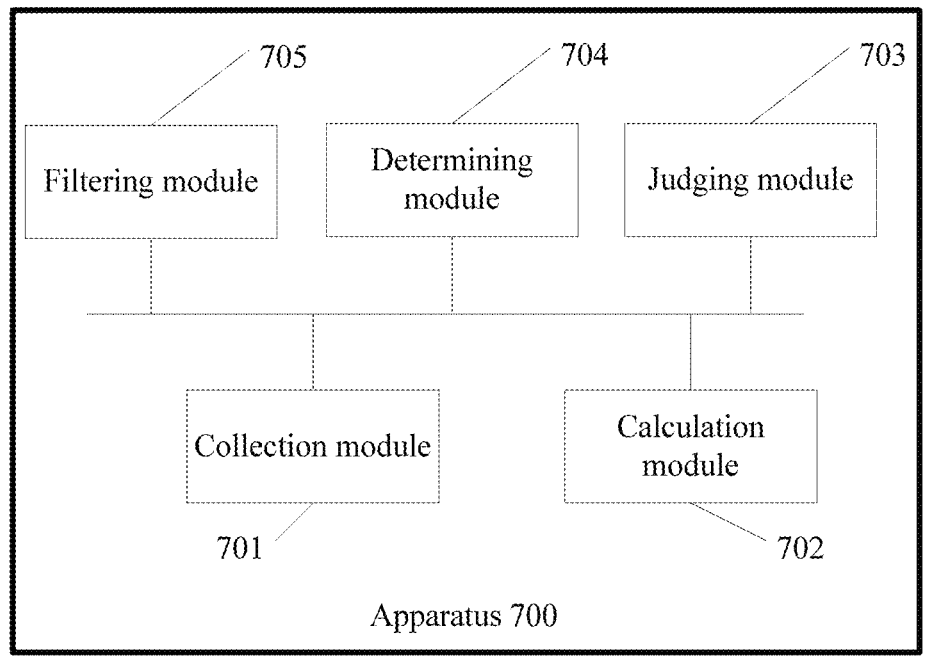
FIG. 7 is a schematic structural diagram of a sound processing apparatus according to an embodiment of the present invention.

As shown in FIG. 7, based on the sound processing method provided in the foregoing embodiment, an embodiment of the present invention provides a sound processing apparatus 700, where the apparatus 700 is applied to a terminal equipped with two microphones at the top of the terminal, the two microphones are located respectively in the front and at the back of the terminal, and the apparatus is applied to a non-video-call scenario. As shown in FIG. 7, the apparatus 700 includes a collection module 701, a calculation module 702, a judging module 703, a determining module 704, and a filtering module 705.

The collection module 701 is configured to: when it is detected that a camera of the terminal is in a shooting state, collect a sound signal in a current environment of the terminal by using the two microphones. The collection module may be implemented by a processor by invoking a program and an instruction in a local memory or a cloud server, to monitor whether a shooting function of the camera is enabled; and if it is detected that the camera is enabled, the processor may further control the microphones to collect a sound signal, and may further convert the collected signals into digital signals by using an audio frequency circuit.

In one embodiment, the collection module 701 may include a detection unit 701a and a receiving unit 701b, where the detection unit 701a is configured to detect whether there is a camera in an enabled state, and can distinguish between a front camera and a rear camera. If it is detected that a camera is in an enabled state, the receiving unit 701b further collects a sound signal in the current environment. Corresponding functions of the two units may be implemented by using a processor invoking a program and an instruction in a memory.

The calculation module 702 is configured to calculate, according to a preset first algorithm, an interaural level difference between the two microphones based on sound signals collected by the collection module 701. The calculation module may be implemented by a processor by invoking an interaural level difference algorithmic program in a local memory or a cloud server, to perform calculation processing on the collected sound signals to obtain the interaural level difference.

The judging module 703 is configured to determine whether the interaural level difference between the two microphones calculated by the calculation module 702 meets a sound source direction determining condition. The judging module may be implemented by a processor by invoking a determining algorithmic program in a local memory or a cloud server, to perform corresponding calculation to obtain a determining result. The determining module 704 is configured to: if the judging module 703 determines that the sound source direction determining condition is met, determine, based on the interaural level difference between the two microphones, whether the sound signal includes a rear sound signal. The determining module may be implemented by a processor. When a received result is that the sound source direction determining condition is met, a rear sound algorithmic program in a local memory or a cloud server may be invoked, to determine whether the sound signal includes a rear sound signal.

The filtering module 705 is configured to: if the determining module 704 determines that the sound signal includes a rear sound signal, filter out the rear sound signal from the sound signal. The filtering module may be implemented by a processor. When it is determined that the sound signal includes a rear sound signal, a noise filter algorithmic program in a local memory or a cloud server may be invoked, to filter out the rear sound signal from the sound signal.

However, usually a field-of-view range within which the camera is capable of shooting is about 120 degrees, but not an entire front area of the camera. Therefore, there may further be a noise signal whose sound source is located in front of the camera and beyond a shooting range of the camera, where this noise signal has a less impact on photographed content than the rear sound signal, and may be defined as a secondary-noise signal. The area mentioned above allows for a specific demarcation error. Therefore, in a specific implementation process, in addition to filtering out the portion of noise in the rear sound signal, the secondary noise may be further filtered out. Reference may be made to the following two examples.

Example 3

A layout case in which there is a microphone separately at the front top, the rear top, and the bottom of the terminal. The following uses, as an example, a layout case in which there is a microphone separately at the front top, the rear top, and the bottom left of the terminal. As shown in FIG. 2B, in this case, regardless of whether a rear sound signal existed previously, the apparatus may further include a secondary-noise filtering module 706, configured to perform the following operations.

If the collection module 701 detects that the terminal is using a front camera for shooting, delay difference localization may be further performed on sound signals collected by the bottom left microphone and the front top microphone, to obtain a longitudinal azimuth of the sound signals; and when the longitudinal azimuth is greater than a preset first angle, it is determined that a sound signal in a $y^{th}$ frame includes a secondary-noise signal. The secondary-noise signal is a noise signal located in front of the front camera and beyond a boundary of a shooting range of the front camera. If it is determined that the sound signal in the $y^{th}$ frame includes a secondary-noise signal, an adaptive filter of the terminal is controlled to filter out, by using a sound signal collected by the rear top microphone as a reference signal, the secondary-noise signal from a sound signal collected by the front top microphone in the $y^{th}$ frame.

If the collection module 701 detects that the terminal is using a rear camera for shooting, delay difference localization may be further performed on sound signals collected by the bottom left microphone and the rear top microphone, to obtain a longitudinal azimuth of the sound signals; and when the longitudinal azimuth is greater than a preset first angle (which may be the same as or different from the preset first angle in the previous paragraph), it is determined that a sound signal in a $y^{th}$ frame includes a secondary-noise signal. In this case, the secondary-noise signal is a noise signal located in front of the rear camera and beyond a boundary of a shooting range of the rear camera. If it is determined that the sound signal in the $y^{th}$ frame includes a secondary-noise signal, an adaptive filter of the terminal is controlled to filter out, by using a sound signal collected by the front top microphone as a reference signal, the secondary-noise signal from a sound signal collected by the rear top microphone in the $y^{th}$ frame.

Example 4

In a layout case in which there is a microphone separately at the front top, the rear top, the bottom left, and the bottom right of the terminal, for ease of reference, the two bottom microphones may also be referred to as a third microphone and a fourth microphone. As shown in FIG. 2C, in this case, regardless of whether a rear sound signal existed previously, the apparatus may further include a secondary-noise filtering module, configured to perform the following operations.

If the collection module 701 detects that the terminal is using a front camera for shooting, delay difference localization may be further performed on sound signals collected by the bottom left microphone and the front top microphone, to obtain a longitudinal azimuth of the sound signals; and when the longitudinal azimuth is greater than a preset first angle, it is determined that a sound signal in a $y^{th}$ frame includes a secondary-noise signal. The secondary-noise signal is a noise signal located in front of the front camera and beyond a boundary of a shooting range of the front camera. Further, delay difference localization is further performed on sound signals collected by the third microphone and the fourth microphone in the $y^{th}$ frame, to obtain a transverse azimuth of the sound signals in the $y^{th}$ frame; and when the transverse azimuth is greater than a preset second angle, it is determined that the sound signal in the $y^{th}$ frame includes a secondary-noise signal. In the foregoing step, if it is determined that the sound signal in the $y^{th}$ frame includes a secondary-noise signal, an adaptive filter of the terminal is controlled to filter out, by using a sound signal collected by the rear top microphone as a reference signal, all secondary-noise signals from a sound signal collected by the front top microphone in the $y^{th}$ frame.

If the collection module 701 detects that the terminal is using a rear camera for shooting, delay difference localization may be further performed on sound signals collected by the bottom left microphone and the rear top microphone, to obtain a longitudinal azimuth of the sound signals; and when the longitudinal azimuth is greater than a preset first angle, determine that a sound signal in a $y^{th}$ frame includes a secondary-noise signal. In this case, the secondary-noise signal is a noise signal located in front of the rear camera and beyond a boundary of a shooting range of the rear camera. Further, delay difference localization may be further performed on sound signals collected by the third microphone and the fourth microphone in the $y^{th}$ frame, to obtain a transverse azimuth of the sound signals in the $y^{th}$ frame; and when the transverse azimuth is greater than a preset second angle (which may be the same as or different from the preset second angle in the previous paragraph), it is determined that the sound signal in the $y^{th}$ frame includes a secondary-noise signal. In the foregoing step, if it is determined that the sound signal in the $y^{th}$ frame includes a secondary-noise signal, an adaptive filter of the terminal is controlled to filter out, by using a sound signal collected by the front top microphone as a reference signal, all secondary-noise signals from a sound signal collected by the rear top microphone in the $y^{th}$ frame.

The secondary-noise filtering module may be implemented by a processor. When it is determined that the sound signal includes a secondary-noise signal, a noise filter algorithmic program in a local memory or a cloud server may be invoked, to filter out the secondary-noise signal from the sound signal.

In one embodiment, the collection module 701 is specifically configured to perform the method mentioned in operation 31 and an equivalent alternative method; the calculation module 702 is specifically configured to perform the method mentioned in operation 32 and an equivalent alternative method; the judging module 703 is specifically configured to perform the method mentioned in operation 33 and an equivalent alternative method; the determining module 704 is specifically configured to perform the method mentioned in operation 34 and an equivalent alternative method; the filtering module 705 is specifically configured to perform the method mentioned in operation 35 and an equivalent alternative method; and the secondary-noise filtering module 706 is specifically configured to perform the method mentioned in operation 36 or operation 37 and an equivalent alternative method. The specific method embodiment and explanations and expressions in the embodiment are also applicable to method execution in the apparatus.

An embodiment of the present invention provides a sound processing apparatus, where the apparatus is applied to a terminal equipped with two microphones at the top of the terminal, the two microphones are located respectively in the front and at the back of the terminal, and the apparatus includes: a collection module 701, a calculation module 702, a judging module 703, a determining module 704, and a filtering module 705; where the collection module 701 collects a sound signal in a current environment by using the two microphones when detecting that a camera of the terminal is in a shooting state; the calculation module 702 calculates an interaural level difference between the two microphones based on collected sound signals according to a preset first algorithm; the judging module 703 determines whether the interaural level difference between the two microphones meets a sound source direction determining condition; if the sound source direction determining condition is met, the determining module 704 determines, based on the interaural level difference between the two microphones, whether the sound signal includes a rear sound signal, where the rear sound signal is a sound signal whose sound source is located behind the camera; and if it is determined that the sound signal includes a rear sound signal, the filtering module 705 filters out the rear sound signal from the sound signal. According to the apparatus, a noise signal beyond a shooting range can be filtered out during shooting, to ensure voice quality of a video during shooting, thereby improving user experience.

It should be understood that division of the modules of the apparatus 700 is merely division of logical functions. During actual implementation, all or some of the modules may be integrated into a physical entity, or may be physically separated. For example, the modules may be processing elements separately disposed, or may be integrated into a chip of a terminal during implementation, or may be stored in a form of program code in a storage element of a controller, and invoked by a processing element of the processor to perform functions of the modules. In addition, the modules may be integrated or may be independently implemented. The processing element herein may be an integrated circuit chip having a signal processing capability. During an implementation process, the steps of the foregoing method or the foregoing modules may be completed by using a hardware-integrated logic circuit in a processing element or instructions in a form of software. The processing element may be a general purpose processor, for example, a central processing unit (English: central processing unit, CPU for short), or may be configured as one or more integrated circuits for implementing the foregoing method, for example, one or more application-specific integrated circuits (English: application specific integrated circuit, ASIC for short), one or more micro digital signal processors (English: digital signal processor, DSP for short), or one or more field programmable gate arrays (English: field-programmable gate array, FPGA for short).

A person skilled in the art should understand that the embodiments of the present invention may be provided as a method, a system, or a computer program product. Therefore, the present invention may use a form of hardware only embodiments, software only embodiments, or embodiments with a combination of software and hardware. Furthermore, the present invention may use a form of a computer program product that is implemented on one or more computer-usable storage media (including but not limited to a magnetic disk memory, a CD-ROM, an optical memory, and the like) that include computer-usable program code.

An embodiment of the present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general purpose computer, a special purpose computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may be stored in a computer readable memory that can instruct the computer or the another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although embodiments of the present invention have been described, a person skilled in the art may make changes and modifications to these embodiments once they learn of the basic inventive concept. Therefore, the following claims are intended to be construed as to cover embodiments and all changes and modifications falling within the scope of the present invention.

Obviously, a person skilled in the art may make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A sound processing method, comprising:
when a camera of a terminal is in a shooting state in a non-video-call scenario, collecting a sound signal in a current environment of the terminal using two microphones disposed on top of the terminal, wherein the two microphones are located in front and back of the terminal as a front top microphone and a rear top microphone respectively;
calculating an interaural level difference between the two microphones based on the collected sound signal according to a preset first algorithm;
determining whether the interaural level difference between the two microphones meets a sound source direction determining condition;
if the sound source direction determining condition is met, determining, based on the interaural level difference between the two microphones, whether the sound signal comprises a rear sound signal whose sound source is located in an area behind the camera and the camera cannot shoot the area behind the camera; and
if it is determined that the sound signal comprises a rear sound signal, filtering out the rear sound signal from the sound signal.

2. The method according to claim 1, wherein calculating an interaural level difference between the two microphones based on the collected sound signal according to a preset first algorithm comprises:
dividing the sound signal into at least one frame based on a preset time interval;
obtaining sound signals S1 and S2 collected by the two microphones in a $y^{th}$ frame, and calculating power spectrums $P_1$ and $P_2$ of S1 and S2 respectively by using a fast Fourier transform (FFT) algorithm, wherein the $y^{th}$ frame is any frame of the at least one frame; and
calculating the interaural level difference between the two microphones based on $P_1$ and $P_2$ by using the following formula:

$$ILD_{now} = \frac{P_1 - P_2}{P_1 + P_2},$$

wherein $P_1$ represents a corresponding sound power spectrum of the front top microphone in the $y^{th}$ frame, $P_2$ represents a corresponding sound power spectrum of the rear top microphone in the $y^{th}$ frame, $P_1$ and $P_2$ are vectors each having N elements, the N elements are values of corresponding N frequencies after a fast Fourier transform is performed on the sound signal in the $y^{th}$ frame, N is an integer greater than 1, and $ILD_{now}$ is a vector comprising interaural level differences corresponding to the N frequencies.

3. The method according to claim 2, wherein determining whether the interaural level difference between the two microphones meets a sound source direction determining condition comprises: for the $y^{th}$ frame, calculating, by using an interaural level difference corresponding to an $i^{th}$ frequency between the two microphones, a maximum reference value and a minimum reference value that correspond to the $i^{th}$ frequency according to a preset second algorithm, wherein the $i^{th}$ frequency is one of the N frequencies, and i is any positive integer not greater than N;

if a difference between the maximum reference value and the minimum reference value that correspond to the $i^{th}$ frequency is greater than a first threshold corresponding to the P frequency, determining that the interaural level difference between the two microphones meets the sound source direction determining condition at the $i^{th}$ frequency; or if a difference between the maximum reference value and the minimum reference value is not greater than a first threshold corresponding to the $i^{th}$ frequency, determining that the interaural level difference between the two microphones does not meet the sound source direction determining condition at the $i^{th}$ frequency; and if the sound source direction determining condition is met at M frequencies of the N frequencies, determining that the interaural level difference between the two microphones meets the sound source direction determining condition in the $y^{th}$ frame, wherein M is greater than or equal to N/2.

4. The method according to claim 3, wherein calculating, by using an interaural level difference corresponding to an $i^{th}$ frequency between the two microphones, a maximum reference value and a minimum reference value that correspond to the $i^{th}$ frequency according to a preset second algorithm comprises:

obtaining a maximum reference value corresponding to an $(i-1)^{th}$ frequency, wherein the $(i-1)^{th}$ frequency is a previous frequency of the $i^{th}$ frequency, and if the interaural level difference corresponding to the $i^{th}$ frequency between the two microphones is not greater than the maximum reference value corresponding to the $(i-1)^{th}$ frequency, calculating the maximum reference value corresponding to the $i^{th}$ frequency by using the following formula:

$$ILD_{max} = \alpha_{low} * ILD_{now} + (1-\alpha_{low}) * ILD_{max}'; \text{ or}$$

if the interaural level difference corresponding to the $i^{th}$ frequency between the two microphones is greater than the maximum reference value corresponding to the $(i-1)^{th}$ frequency, calculating the maximum reference value corresponding to the $i^{th}$ frequency by using the following formula:

$$ILD_{max} = \alpha_{fast} * ILD_{now} + (1-\alpha_{fast}) * ILD_{max}'; \text{ and}$$

obtaining a minimum reference value corresponding to the $(i-1)^{th}$ frequency, and if the interaural level difference corresponding to the $i^{th}$ frequency between the two microphones is greater than the minimum reference value corresponding to the $(i-1)^{th}$ frequency, calculating the minimum reference value corresponding to the $i^{th}$ frequency by using the following formula:

$$ILD_{min} = \alpha_{low} * ILD_{fast} + (1-\alpha_{low}) * ILD_{min}'; \text{ or}$$

if the interaural level difference corresponding to the $i^{th}$ frequency between the two microphones is not greater than the minimum reference value corresponding to the $(i-1)^{th}$ frequency, calculating the minimum reference value corresponding to the $i^{th}$ frequency by using the following formula:

$$ILD_{min} = \alpha_{fast} * ILD_{low} + (1-\alpha_{low}) * ILD_{min}';$$

wherein $ILD_{now}$ represents the interaural level difference corresponding to the $i^{th}$ frequency between the two microphones, $ILD_{max}$ represents the maximum reference value corresponding to the $i^{th}$ frequency, $ILD_{max}'$ represents the maximum reference value corresponding to the $(i-1)^{th}$ frequency, $ILD_{min}$ represents the minimum reference value corresponding to the $i^{th}$ frequency, $ILD_{min}'$ represents the minimum reference value corresponding to the $(i-1)^{th}$ frequency, $\alpha_{fast}$ and $\alpha_{low}$ represent preset step values, and $\alpha_{fast} > \alpha_{low}$.

5. The method according to claim 1, wherein determining, based on the interaural level difference between the two microphones, whether the sound signal comprises a rear sound signal comprises: for the $y^{th}$ frame, when an interaural level difference corresponding to a $j^{th}$ frequency between the two microphones is less than a second threshold corresponding to the $j^{th}$ frequency, determining that a rear sound signal is comprised at the $j^{th}$ frequency, wherein the $j^{th}$ frequency is one of the M frequencies, and j is any positive integer not greater than M; or when an interaural level difference corresponding to a $j^{th}$ frequency between the two microphones is not less than a second threshold, determining that a rear sound signal is not comprised at the $j^{th}$ frequency.

6. The method according to claim 1, wherein filtering out the rear sound signal from the sound signal comprises:

if a camera currently being used by the terminal for shooting is a front camera, controlling an adaptive filter of the terminal to filter out, by using a sound signal collected by the rear top microphone as a reference signal, the rear sound signal from a sound signal collected by the front top microphone in the $y^{th}$ frame; or if a camera currently being used by the terminal for shooting is a rear camera, controlling an adaptive filter of the terminal to filter out, by using a sound signal collected by the front top microphone as a reference signal, the rear sound signal from a sound signal collected by the rear top microphone in the $y^{th}$ frame.

7. The method according to claim 1, wherein if the terminal further comprises a third microphone at a bottom of the terminal, and the front camera is being used for shooting, the method further comprises:

performing delay difference localization on sound signals collected by the third microphone and the front top microphone in the $y^{th}$ frame, to obtain a longitudinal azimuth of the sound signals in the $y^{th}$ frame;

when the longitudinal azimuth is greater than a preset first angle, determining that the sound signal in the $y^{th}$ frame comprises a secondary-noise signal, wherein the secondary-noise signal is a noise signal located in front of the front camera and beyond a shooting range of the front camera; and if it is determined that the sound signal in the $y^{th}$ frame comprises a secondary-noise signal, controlling the adaptive filter of the terminal to filter out, by using a sound signal collected by the rear top microphone as a reference signal, the secondary-noise signal from the sound signal collected by the front top microphone in the $y^{th}$ frame.

8. The method according to claim 1, wherein if the terminal further comprises a third microphone at a bottom of the terminal, and the rear camera is being used for shooting, the method further comprises:

performing delay difference localization on sound signals collected by the third microphone and the rear top microphone in the $y^{th}$ frame, to obtain a longitudinal azimuth of the sound signals in the $y^{th}$ frame;

when the longitudinal azimuth is greater than a preset first angle, determining that the sound signal in the $y^{th}$ frame comprises a secondary-noise signal, wherein the secondary-noise signal is a noise signal located in front of the rear camera and beyond a shooting range of the rear camera; and if it is determined that the sound signal in the $y^{th}$ frame comprises a secondary-noise signal, controlling the adaptive filter of the terminal to filter out, by using a sound signal collected by the front top microphone as a reference signal, the secondary-noise signal from the sound signal collected by the rear top microphone in the $y^{th}$ frame.

9. The method according to claim 7, wherein if the terminal further comprises a fourth microphone at a bottom of the terminal, and the third microphone and the fourth microphone are arranged on left and right at the bottom of the terminal, the method further comprises:

performing delay difference localization on sound signals collected by the third microphone and the fourth microphone in the $y^{th}$ frame, to obtain a transverse azimuth of the sound signals in the $y^{th}$ frame;

when the transverse azimuth is greater than a preset second angle, determining that the sound signal in the $y^{th}$ frame comprises a secondary-noise signal; and if it is determined that the sound signal in the $y^{th}$ frame comprises a secondary-noise signal, controlling the adaptive filter of the terminal to filter out, by using a sound signal collected by the rear top microphone as a reference signal, the secondary-noise signal from the sound signal collected by the front top microphone in the $y^t$ frame.

10. The method according to claim 8, wherein if the terminal further comprises a fourth microphone at a bottom of the terminal, and the third microphone and the fourth microphone are arranged on left and right at the bottom of the terminal, the method further comprises:

performing delay difference localization on sound signals collected by the third microphone and the fourth microphone in the $y^{th}$ frame, to obtain a transverse azimuth of the sound signals in the $y^{th}$ frame;

when the transverse azimuth is greater than a preset second angle, determining that the sound signal in the $y^{th}$ frame comprises a secondary-noise signal; and if it is determined that the sound signal in the $y^{th}$ frame comprises a secondary-noise signal, controlling the adaptive filter of the terminal to filter out, by using a sound signal collected by the front top microphone as a reference signal, the secondary-noise signal from the sound signal collected by the rear top microphone in the $y^{th}$ frame.

11. A sound processing apparatus, comprising:

a collection module configured to: when a camera of a terminal is in a shooting state a non-video-call scenario, collect a sound signal in a current environment of the terminal by using two microphones disposed at top of the terminal, wherein the two microphones are located at front and back of the terminal as a front top microphone and a rear top microphone respectively;

a calculation module configured to calculate an interaural level difference between the two microphones based on the collected sound signal according to a preset first algorithm;

a judging module configured to determine whether the interaural level difference between the two microphones meets a sound source direction determining condition;

a determining module configured to, if the sound source direction determining condition is met, determine, based on the interaural level difference between the two microphones, whether the sound signal comprises a rear sound signal whose sound source is located behind the camera and the camera cannot shoot an area behind the camera; and a filtering module configured to, if it is determined that the sound signal comprises a rear sound signal, filter out the rear sound signal from the sound signal.

12. The apparatus according to claim 11, wherein the calculation module is configured to:

divide the sound signal into at least one frame based on a preset time interval;

obtain sound signals S1 and S2 collected by the two microphones in a $y^{th}$ frame, and calculate power spectrums $P_1$ and $P_2$ of S1 and S2 respectively by using a fast Fourier transform FFT algorithm, wherein the $y^{th}$ frame is any frame of the at least one frame; and calculate the interaural level difference between the two microphones based on $P_1$ and $P_2$ by using the following formula:

$$ILD_{now} = \frac{P_1 - P_2}{P_1 + P_2}$$

wherein $P_1$ represents a corresponding sound power spectrum of the front top microphone in the $y^{th}$ frame, $P_2$ represents a corresponding sound power spectrum of the rear top microphone in the $y^{th}$ frame, both $P_1$ and $P_2$ are vectors each having N elements, the N elements are values of corresponding N frequencies after a fast Fourier transform is performed on the sound signal in the $y^{th}$ frame, N is an integer greater than 1, and $ILD_{now}$ is a vector comprising interaural level differences corresponding to the N frequencies.

13. The apparatus according to claim 12, wherein the judging module is configured to: for the $y^{th}$ frame, calculate, by using an interaural level difference corresponding to an $i^{th}$ frequency between the two microphones, a maximum reference value and a minimum reference value that correspond to the i frequency according to a preset second algorithm, wherein the $i^{th}$ frequency is one of the N frequencies, and i is any positive integer not greater than N;

if a difference between the maximum reference value and the minimum reference value that correspond to the $i^{th}$ frequency is greater than a first threshold corresponding to the i frequency, determine that the interaural level difference between the two microphones meets the sound source direction determining condition at the $i^{th}$ frequency; or if a difference between the maximum reference value and the minimum reference value is not greater than a first threshold corresponding to the $i^{th}$ frequency, determine that the interaural level difference between the two microphones does not meet the sound source direction determining condition at the $i^{th}$ frequency; and if the sound source direction determining condition is met at M frequencies of the N frequencies, determine that the interaural level difference between the two microphones meets the sound source direction determining condition in the $y^{th}$ frame, wherein M is greater than or equal to N/2.

14. The apparatus according to claim 13, wherein the judging module is configured to:

obtain a maximum reference value corresponding to an $(i-1)^{th}$ frequency, wherein the $(i-1)^{th}$ frequency is a previous frequency of the it frequency, and if the interaural level difference corresponding to the $i^{th}$ frequency between the two microphones is not greater than the maximum reference value corresponding to the $(i-1)^{th}$ frequency, calculate the maximum reference value corresponding to the $i^{th}$ frequency by using the following formula:

$ILD_{max}=\alpha_{low}*ILD_{now}+(1-\alpha_{low})*ILD_{max}'$; or if the interaural level difference corresponding to the $i^{th}$ frequency between the two microphones is greater than the maximum reference value corresponding to the $(i-1)^{th}$ frequency, calculate the maximum reference value corresponding to the $i^{th}$ frequency by using the following formula:

$ILD_{max}=\alpha_{fast}*ILD_{now}+(1-\alpha_{fast})*ILD_{max}'$; and obtain a minimum reference value corresponding to the $(i-1)^{th}$ frequency, and if the interaural level difference corresponding to the $i^{th}$ frequency between the two microphones is greater than the minimum reference value corresponding to the $(i-1)^{th}$ frequency, calculate the minimum reference value corresponding to the $i^{th}$ frequency by using the following formula:

$ILD_{min}=\alpha_{low}*ILD_{now}+(1-\alpha_{low})*ILD_{min}'$; or if the interaural level difference corresponding to the i frequency between the two microphones is not greater than the minimum reference value corresponding to the $(i-1)^{th}$ frequency, calculate the minimum reference value corresponding to the $i^{th}$ frequency by using the following formula:

$ILD_{min}=\alpha_{fast}*ILD_{now}+(1-\alpha_{fast})*ILD_{min}'$;

wherein $ILD_{now}$ represents the interaural level difference corresponding to the $i^{th}$ frequency between the two microphones, $ILD_{max}$ represents the maximum reference value corresponding to the $i^{th}$ frequency, $ILD_{max}'$ represents the maximum reference value corresponding to the $(i-1)^{th}$ frequency, $ILD_{min}$ represents the minimum reference value corresponding to the $i^{th}$ frequency, $ILD_{min}'$ represents the minimum reference value corresponding to the $(i-1)^{th}$ frequency, $\alpha_{fast}$ and $\alpha_{low}$ represent preset step values, and $\alpha_{fast}>\alpha_{low}$.

15. The apparatus according to claim 11, wherein the determining module is configured to: for the $y^{th}$ frame, when an interaural level difference corresponding to a $j^{th}$ frequency is less than a second threshold corresponding to the $j^{th}$ frequency, determine that a rear sound signal is comprised at the $j^{th}$ frequency, wherein the $j^{th}$ frequency is one of the M frequencies, and j is any positive integer not greater than M; or when an interaural level difference corresponding to a $j^{th}$ frequency between the two microphones is not less than a second threshold, determine that a rear sound signal is not comprised at the $j^{th}$ frequency.

16. The apparatus according to claim 11, wherein the filtering module is configured to:

if a camera currently being used by the terminal for shooting is a front camera, controlling an adaptive filter of the terminal to filter out, by using a sound signal collected by the rear top microphone as a reference signal, the rear sound signal from a sound signal collected by the front top microphone in the $y^{th}$ frame; or if a camera currently being used by the terminal for shooting is a rear camera, controlling an adaptive filter of the terminal to filter out, by using a sound signal collected by the front top microphone as a reference signal, the rear sound signal from a sound signal collected by the rear top microphone in the $y^{th}$ frame.

17. The apparatus according to claim 11, wherein if the terminal further comprises a third microphone at a bottom of the terminal, and the front camera is being used for shooting, the apparatus further comprises a secondary-noise filtering module configured to:

perform delay difference localization on sound signals collected by the third microphone and the front top microphone in the $y^{th}$ frame, to obtain a longitudinal azimuth of the sound signals in the $y^{th}$ frame;

when the longitudinal azimuth is greater than a preset first angle, determine that the sound signal in the $y^{th}$ frame comprises a secondary-noise signal, wherein the secondary-noise signal is a noise signal located in front of the front camera and beyond a shooting range of the front camera; and if it is determined that the sound signal in the $y^{th}$ frame comprises a secondary-noise signal, controlling the adaptive filter of the terminal to filter out, by using a sound signal collected by the rear top microphone as a reference signal, the secondary-noise signal from the sound signal collected by the front top microphone in the $y^{th}$ frame.

18. The apparatus according to claim 11, wherein if the terminal further comprises a third microphone at a bottom of the terminal, and the rear camera is being used for shooting, the apparatus further comprises a secondary-noise filtering module configured to:

perform delay difference localization on sound signals collected by the third microphone and the rear top microphone in the $y^{th}$ frame, to obtain a longitudinal azimuth of the sound signals in the $y^{th}$ frame;

when the longitudinal azimuth is greater than a preset first angle, determine that the sound signal in the $y^{th}$ frame comprises a secondary-noise signal, wherein the secondary-noise signal is a noise signal located in front of the rear camera and beyond a shooting range of the rear camera; and if it is determined that the sound signal in the $y^{th}$ frame comprises a secondary-noise signal, controlling the adaptive filter of the terminal to filter out, by using a sound signal collected by the front top microphone as a reference signal, the secondary-noise signal from the sound signal collected by the rear top microphone in the $y^{th}$ frame.

19. The apparatus according to claim 17, wherein if the terminal further comprises a fourth microphone at a bottom of the terminal, and the third microphone and the fourth microphone are arranged on left and right at the bottom of the terminal, the secondary-noise filtering module is configured to:

perform delay difference localization on sound signals collected by the third microphone and the fourth microphone in the $y^{th}$ frame, to obtain a transverse azimuth of the sound signals in the $y^{th}$ frame;

when the transverse azimuth is greater than a preset second angle, determine that the sound signal in the $y^{th}$ frame comprises a secondary-noise signal; and if it is determined that the sound signal in the $y^{th}$ frame comprises a secondary-noise signal, controlling the adaptive filter of the terminal to filter out, by using a sound signal collected by the rear top microphone as a reference signal, the secondary-noise signal from the sound signal collected by the front top microphone in the $y^{th}$ frame.

20. The apparatus according to claim 18, wherein if the terminal further comprises a fourth microphone at a bottom of the terminal, and the third microphone and the fourth microphone are arranged on left and right at the bottom of the terminal, the secondary-noise filtering module is configured to:

perform delay difference localization on sound signals collected by the third microphone and the fourth microphone in the $y^{th}$ frame, to obtain a transverse azimuth of the sound signals in the $y^{th}$ frame;

when the transverse azimuth is greater than a preset second angle, determine that the sound signal in the $y^{th}$ frame comprises a secondary-noise signal; and if it is determined that the sound signal in the $y^{th}$ frame comprises a secondary-noise signal, controlling the adaptive filter of the terminal to filter out, by using a sound signal collected by the front top microphone as a reference signal, the secondary-noise signal from the sound signal collected by the rear top microphone in the $y^{th}$ frame.

21. A terminal device, wherein the device is applied to a non-video-call scenario, and the terminal device comprises:

a camera, a memory, a processor, a bus, and two microphones disposed at top of the terminal device, wherein the two top microphones, the camera, the memory, and the processor are connected via the bus; the two top microphones are located respectively at front and back of the terminal device;

the microphones are configured to collect a sound signal under control of the processor;

the camera is configured to collect an image signal under the control of the processor;

the memory is configured to store a computer program and an instruction; and the processor is configured to invoke the computer program and the instruction stored in the memory to perform the method according to claim 1.

22. The terminal device according to claim 21, further comprising an antenna system, wherein the antenna system sends or receives a wireless communication signal under the control of the processor to implement wireless communication with a mobile communications network, and the mobile communications network comprises one or more of the following: a GSM network, a CDMA network, a 3G network, an FDMA network, a TDMA network, a PDC network, a TACS network, an AMPS network, a WCDMA network, a TDSCDMA network, a Wi-Fi network, and an LTE network.

* * * * *